(12) United States Patent
Clear et al.

(10) Patent No.: US 10,072,173 B2
(45) Date of Patent: Sep. 11, 2018

(54) POLYMETHYLMETHACRYLATE BASED HARDCOAT COMPOSITION AND COATED ARTICLE

(71) Applicant: 3M INNOVATIVE PROPERTIES COMPANY, St. Paul, MN (US)

(72) Inventors: Susannah C. Clear, Hastings, MN (US); Raghunath Padiyath, Woodbury, MN (US); Garry W. Lachmansingh, Plymouth, MN (US); Mark A. Strobel, Maplewood, MN (US); Sonja S. Mackey, St. Paul, MN (US); Naiyong Jing, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 669 days.

(21) Appl. No.: 14/387,072

(22) PCT Filed: Mar. 14, 2013

(86) PCT No.: PCT/US2013/031249
§ 371 (c)(1),
(2) Date: Sep. 22, 2014

(87) PCT Pub. No.: WO2013/142239
PCT Pub. Date: Sep. 26, 2013

(65) Prior Publication Data
US 2015/0037567 A1    Feb. 5, 2015

Related U.S. Application Data

(60) Provisional application No. 61/614,297, filed on Mar. 22, 2012.

(51) Int. Cl.
| | |
|---|---|
| *C09D 133/12* | (2006.01) |
| *C09D 4/06* | (2006.01) |
| *C09D 133/14* | (2006.01) |
| *C08K 3/36* | (2006.01) |
| *C08K 5/3435* | (2006.01) |
| *C08K 5/3492* | (2006.01) |
| *C09D 7/48* | (2018.01) |

(52) U.S. Cl.
CPC .............. *C09D 133/12* (2013.01); *C08K 3/36* (2013.01); *C08K 5/3435* (2013.01); *C08K 5/3492* (2013.01); *C09D 4/06* (2013.01); *C09D 7/48* (2018.01); *C09D 133/14* (2013.01); *C08L 2312/00* (2013.01); *Y10T 428/259* (2015.01); *Y10T 428/3154* (2015.04); *Y10T 428/31507* (2015.04); *Y10T 428/31797* (2015.04); *Y10T 428/31913* (2015.04); *Y10T 428/31938* (2015.04)

(58) Field of Classification Search
CPC .......... C09D 133/12; C09D 4/06; C09D 7/48; C08K 5/34; C08K 5/3492; C08K 5/3435; C08K 3/36
See application file for complete search history.

(56) References Cited

U.S. PATENT DOCUMENTS

| | | | |
|---|---|---|---|
| 4,486,504 A | 12/1984 | Chung | |
| 4,728,571 A | 3/1988 | Clemens | |
| 4,732,831 A | 3/1988 | Riesenfeld | |
| 4,822,828 A | 4/1989 | Swofford | |
| 4,856,670 A | 8/1989 | Hang | |
| 4,863,802 A | 9/1989 | Moore | |
| 4,902,578 A | 2/1990 | Kerr, III | |
| 4,954,591 A | 9/1990 | Belmares | |
| 5,075,348 A | 12/1991 | Revis | |
| 5,162,390 A | 11/1992 | Tilley | |
| 5,188,900 A | 2/1993 | Revis | |
| 5,214,085 A | 5/1993 | Patel | |
| 5,262,450 A | 11/1993 | Vara | |
| 5,318,850 A | 6/1994 | Pickett | |
| 5,401,541 A | 3/1995 | Hodnett, III | |
| 5,648,407 A | 7/1997 | Goetz | |

(Continued)

FOREIGN PATENT DOCUMENTS

| | | |
|---|---|---|
| CN | 1400265 | 3/2003 |
| CN | 1667004 | 9/2005 |

(Continued)

OTHER PUBLICATIONS

Chiantore, "Photooxidative degradation of acrylic and methacrylic polymers", Polymer, 2000, vol. 41, No. 5, pp. 1657-1668.
Chiantore, "Photo-oxidative stability of paraloid acrylic protective polymers", Polymer, 2001, vol. 42, pp. 17-27.
Lazzari, "Thermal-ageing of paraloid acrylic protective polymers", Polymer, 2000, vol. 41, pp. 6447-6455.

(Continued)

*Primary Examiner* — Peter D Mulcahy

(57) ABSTRACT

A coating composition is disclosed. The coating composition includes a poly(methyl methacrylate) polymer or copolymer having a weight average molecular weight of at least 50,000 grams per mole; monomer comprising at least one of an alkylene diacrylate, alkylene dimethacrylate, cycloalkylene diacrylate, or cycloalkylenedimethacrylate, wherein the at least one of an alkylene diacrylate, alkylene dimethacrylate, cycloalkylene diacrylate, or cycloalkylenedimethacrylate provides at least 80 percent by weight of the monomer; and a stabilizer against ultraviolet light. An article including a coating on a surface of a substrate and a method of making the article are also disclosed. The coating on the surface of the substrate is obtained by curing the disclosed coating composition.

20 Claims, 2 Drawing Sheets

(56) References Cited

U.S. PATENT DOCUMENTS

| | | |
|---|---|---|
| 5,677,050 A | 10/1997 | Bilkadi |
| 5,698,270 A | 12/1997 | Rigamonti |
| 5,700,894 A | 12/1997 | Krieg et al. |
| 5,708,048 A | 1/1998 | Medford |
| 5,811,472 A | 9/1998 | Patel |
| 6,218,004 B1 | 4/2001 | Shaw |
| 6,299,799 B1 | 10/2001 | Craig |
| 6,335,380 B1 | 1/2002 | Wilhelm |
| 6,462,884 B2 | 10/2002 | Hung |
| 6,682,872 B2 | 1/2004 | Sachdev |
| 6,716,891 B1* | 4/2004 | Meisenburg ............ C09D 4/06 |
| | | 428/413 |
| 6,905,735 B2 | 6/2005 | Krohn |
| 7,008,975 B2 | 3/2006 | Chang |
| 7,101,616 B2 | 9/2006 | Arney |
| 7,157,146 B2 | 1/2007 | Higuchi et al. |
| 7,241,480 B2 | 7/2007 | Hashimoto |
| 7,442,442 B2 | 10/2008 | Strobel |
| 7,727,610 B2 | 6/2010 | Oguni |
| 7,741,635 B2 | 6/2010 | Kim |
| 7,915,370 B2 | 3/2011 | Sherman |
| 7,943,681 B2 | 5/2011 | Lee |
| 8,216,357 B2 | 7/2012 | Pickett |
| 8,501,876 B2 | 8/2013 | Lehmann |
| 2001/0008691 A1 | 7/2001 | Isogai et al. |
| 2005/0064183 A1 | 3/2005 | Lunsford |
| 2005/0106333 A1 | 5/2005 | Lehmann |
| 2005/0245636 A1 | 11/2005 | Fechter |
| 2006/0209403 A1 | 9/2006 | Parusel et al. |
| 2007/0098884 A1 | 5/2007 | Hasskerl et al. |
| 2007/0213427 A1* | 9/2007 | Lehmann ............ C03C 17/32 |
| | | 523/160 |
| 2007/0237967 A1 | 10/2007 | Buckel |
| 2007/0238845 A1 | 10/2007 | Hashimoto |
| 2008/0026334 A1 | 1/2008 | Williamson |
| 2009/0017306 A1 | 1/2009 | Hildenbrand |
| 2009/0181242 A1 | 7/2009 | Enniss |
| 2009/0214969 A1 | 8/2009 | Coggan |
| 2009/0283144 A1 | 11/2009 | Hebrink |
| 2011/0052919 A1 | 3/2011 | Yokoyama et al. |
| 2011/0318567 A1 | 12/2011 | Hildenbrand |
| 2012/0011850 A1 | 1/2012 | Hebrink |
| 2013/0001825 A1* | 1/2013 | Schultes ............ B29C 45/1679 |
| | | 264/255 |

FOREIGN PATENT DOCUMENTS

| | | |
|---|---|---|
| CN | 1800281 | 7/2006 |
| CN | 101033358 | 9/2007 |
| EP | 0386297 | 9/1990 |
| EP | 0570254 | 11/1993 |
| JP | 61-207476 | 9/1986 |
| JP | 2-150431 | 6/1990 |
| JP | 1992-107144 | 4/1992 |
| JP | 9-194761 | 7/1997 |
| JP | 10292004 | 11/1998 |
| KR | 2002-0008267 | 1/2002 |
| KR | 10-2010-0121281 | 11/2010 |
| NZ | 541264 | 1/2008 |
| SU | 524529 | 8/1976 |
| WO | 1998-27171 | 6/1998 |
| WO | 2005-040055 | 5/2005 |
| WO | 2010-060702 | 6/2010 |
| WO | 2012-047867 | 4/2012 |
| WO | 2012-047877 | 4/2012 |
| WO | 2014-186113 | 11/2014 |

OTHER PUBLICATIONS

Moussa, Semi-Interpenetrating Polymer Networks Synthesis by Photocrosslinking of Acrylic Monomers in a Polymer Matrix:, Journal of Polymer Science: Part A: Polymer Chemistry, 1993, vol. 31, pp. 2633-2642.

International Search Report for PCT International Application No. PCT/US2013/031249, dated Jul. 1, 2013, 3pgs.

* cited by examiner

POLYMETHYLMETHACRYLATE BASED HARDCOAT COMPOSITION AND COATED ARTICLE

CROSS-REFERENCE TO RELATED APPLICATION

This application is a national stage filing under 35 U.S.C. 371 of PCT/US2013/031249, filed Mar. 14, 2013, which claims priority to U.S. Provisional Application No. 61/614,297, filed Mar. 22, 2012, the disclosure of which is incorporated by reference in its entirety herein.

STATEMENT REGARDING FEDERALLY SPONSORED RESEARCH OR DEVELOPMENT

This invention was made with government support under contract number DE-FC36-08G018027 awarded by the Department of Energy. The Government has certain rights in this invention.

BACKGROUND

Polymeric films and other substrates are useful in a wide variety of indoor and outdoor applications. It is often desirable that polymeric films and substrates have a surface finish that is devoid of ripples, scratches, and other imperfections. However, polymeric surfaces may tend to be somewhat soft and easily scratched or marred. Blown or otherwise contacting abrasive particles can scratch an unprotected polymeric surface, and contact cleaning operations also can similarly mar an unprotected polymeric surface. To overcome these tendencies, protective coatings are sometimes used on polymeric films and substrates. Ultra-violet light and other radiation curable acrylic coating compositions can be applied to some polymeric surfaces and cured to provide a protective coating, sometimes referred to as a hardcoat.

SUMMARY

The present disclosure provides coating compositions that may be applied to polymeric surfaces. The resulting coatings typically adhere well to polymeric substrates even after exposure to accelerated weathering, which can make them useful, for example, in the field of solar energy conversion. The coating compositions typically provide coatings that are more abrasion-resistant than the polymeric substrates themselves, as determined by haze measurement after a falling sand abrasion evaluation. In some embodiments, the coated articles disclosed herein are readily cleanable and/or resist the accumulation of dust.

In one aspect, the present disclosure provides a coating composition. The coating composition includes a poly(methyl methacrylate) polymer or copolymer, monomer, and a stabilizer against ultraviolet light. The poly(methyl methacrylate) polymer or copolymer has a weight average molecular weight of at least 50,000 grams per mole. The monomer, which may be a single monomer or a mixture of monomers, includes at least one of an alkylene diacrylate, alkylene dimethacrylate, cycloalkylene diacrylate, or cycloalkylenedimethacrylate. The alkylene diacrylate, alkylene dimethacrylate, cycloalkylene diacrylate, and/or cycloalkylenedimethacrylate provides at least 80 percent by weight of the monomer.

In another aspect, the present disclosure provides an article including a substrate and a first coating on a surface of the substrate. The first coating is obtained by curing the coating composition disclosed herein. In some embodiments, the article further includes a second coating disposed on the first coating. In some of these embodiments, the second coating includes silica particles having an average particle size of up to 500 nanometers.

In another aspect, the present disclosure provides a method of making an article. The method includes contacting a surface of a substrate with the coating composition disclosed herein; removing organic solvent, if present, from the coating composition; and exposing the coating composition to actinic radiation to provide a first coating on the surface of the polymeric substrate. Typically, in this method, the coating composition includes a photoinitiator.

In some embodiments, of the foregoing aspects of the article or method of making the article, the substrate is a polymeric substrate. In some embodiments, the substrate is a thermoplastic substrate. In some of these embodiments, the substrate includes an acrylic, a polyester, a polycarbonate, a blend of PVDF and PMMA, or a combination thereof.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated.

"Alkyl group", "alkylene", and the prefix "alk-" are inclusive of both straight chain and branched chain groups. "Alkylene" is the divalent form of "alkyl". Unless otherwise specified, alkyl or alkylene groups herein have up to 20 carbon atoms. Cycloalkyl and cycloalkylene groups can be monocyclic or polycyclic and, unless otherwise specified, have from 3 to 10 ring carbon atoms. Alkyl, alkylene, cycloalkyl, and cycloalkylene groups contain only carbon and hydrogen atoms.

The term "solvent" refers to a homogeneous liquid material, which may be a single compound or a combination of compounds and which may or may not include water, that is capable of at least partially dissolving the coating composition disclosed herein at 25° C.

The term "polymer" refers to a molecule having a structure which includes the multiple repetition of units derived, actually or conceptually, from molecules of low relative molecular mass.

The term "monomer" refers to a molecule of low relative molecular mass that can combine with others to form a polymer, which may be an acrylic polymer or copolymer.

The term "acrylic" refers acrylic and methacrylic polymers, which may be copolymers made from one or more acrylates or methacrylates or other vinyl-containing monomers.

The above summary of the present disclosure is not intended to describe each disclosed embodiment or every implementation of the present disclosure. The description that follows more particularly exemplifies illustrative embodiments. It is to be understood, therefore, that the drawings and following description are for illustration purposes only and should not be read in a manner that would unduly limit the scope of this disclosure.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
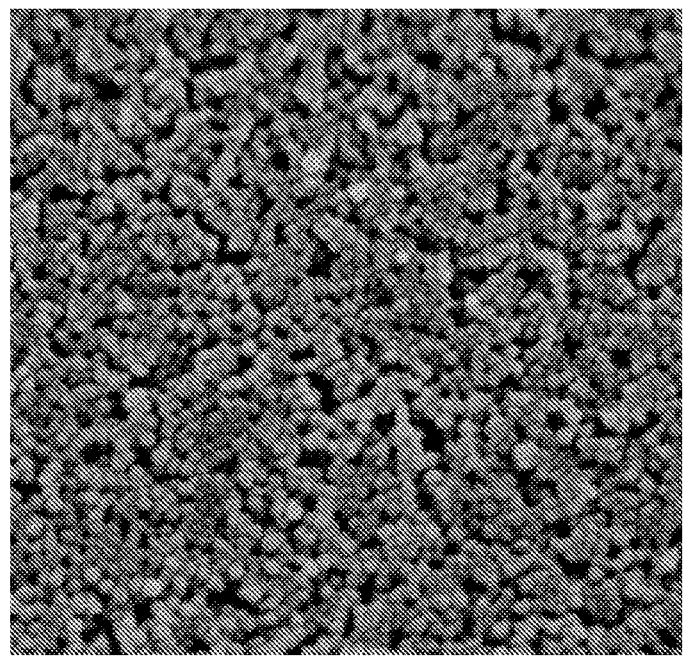
FIG. 1 is a scanning electron micrograph at 60,000× magnification of a representative surface of Example 1C after accelerated weathering.

One field in which abrasion-resistant polymeric surfaces can be useful is the field of solar energy conversion, in which sunlight is converted into electricity. Concentrated solar power (CSP, also known as "concentrating solar power") technology uses sunlight directed at heat transfer fluids that heat up and whose thermal energy is then transferred (e.g., for heating) or turned into electrical power (e.g., by use of a turbine generator). CSP systems typically use lenses or reflectors to focus a large area of sunlight into a small beam. The concentrated sunlight is then used as a heat source for a conventional power plant (e.g., a steam-driven turbine generator). Concentrating or concentrated photovoltaic (CPV) systems include photovoltaic cells or other photovoltaic materials that convert the energy within sunlight to electrical energy. Reflective, refractive, or both reflective and refractive elements are used to concentrate sunlight onto the photovoltaic cells or materials. The use of the reflective and/or refractive materials reduce the quantity of the more expensive photovoltaic materials required in the system.

To allow solar energy conversion to be competitive with more traditional sources of electricity, ongoing efforts seek to reduce the cost and/or improve the efficiency of solar energy conversion systems. Mirror assemblies based on silvered polymeric mirror films instead of glass-based mirror systems have the potential to reduce the installed system cost of solar fields by 20% or more, but polymeric mirror films can be less abrasion-resistant and cleanable than their glass-based counterparts.

The ability to effectively clean the reflectors and lenses employed in solar energy conversion systems without damaging them is important because soiling and surface scratches adversely affect the accuracy of light direction from these elements. Examples of adverse effects from soiling and surface scratches include decreased specular reflectance from mirror films, loss of light concentration from Fresnel lenses, and compromised retroreflectivity from retroreflective elements. Losses in specular reflectance translate directly to lost revenue. It is therefore desirable to improve the durability of the specular reflectance of the surfaces of polymeric mirror films to approach the performance of glass-based mirror systems.

The coating compositions according to the present disclosure can typically provide abrasion-resistant coatings on polymeric surfaces. The coating compositions typically adhere well to polymeric surfaces even after exposure to weathering conditions. Further, in some embodiments, the coatings are cleanable or resistant to dust accumulation.

The coating composition according to the present disclosure includes a poly(methyl methacrylate) (PMMA) polymer, which may be a homopolymer or copolymer. The PMMA polymer or copolymer has a weight average molecular weight of at least 50,000 grams per mole. In some embodiments, the PMMA polymer or copolymer has a weight average molecular weight of at least 75,000 grams per mole, 100,000 grams per mole, 120,000 grams per mole, 125,000 grams per mole, 150,000 grams per mole, 165,000 grams per mole, or 180,000 grams per mole. The PMMA polymer or copolymer may have a weight average molecular weight of up to 500,000 grams per mole, in some embodiments, up to 400,000 grams per mole, and in some embodiments, up to 250,000 grams per mole. It should generally be understood that the PMMA polymer or copolymer is a linear polymer or copolymer. When the PMMA polymer or copolymer has a weight average molecular weight of at least 50,000 grams per mole, as described in any of the above embodiments, it has long enough polymer chains to be entangled in an interpenetrating network with the diacrylate or dimethacrylate after curing. Without wishing to be bound by theory, it is believed that any chain scission that may occur upon exposure to UV light will not completely disentangle the PMMA polymer or copolymer chains in the cured coating composition.

Weight average molecular weights can be measured, for example, by gel permeation chromatography (i.e., size exclusion chromatography (SEC)) using techniques known in the art. In general, the PMMA polymer or copolymer useful for practicing the present disclosure has the weight average molecular weight as specified in any of the above embodiments as determined by SEC with 4 "PL-GEL" (Polymer Labs, England) columns, 30×0.78 cm, in series, with a gel particle diameter of 5 micrometers and a nominal porosity of the individual columns: 500, 103, 104, and 105, respectively. Sample solutions, approximately 0.2% (weight/volume) concentration, are prepared in distilled tetrahydrofuran, which is also the chromatographic eluent. Before injections, the solutions are filtered on 0.45 micrometer membrane syringe filters. The injection volume is 200 microliters, and the eluent flow rate is set at 1 cubic centimeter per minute. o-Dichloro benzene can be added to the polymer solutions as a flow rate internal standard. Column calibration can be performed with PMMA narrow distribution standards (Polymer Labs, England) and a third order polynomial equation can be obtained from regression analysis. For comparison of chromatograms obtained from different samples, the peak areas can be normalised. This method is described in Lazzari, M. and Chiantore, O. *Polymer* 41 (2000) 6447-6455.

Useful copolymers of PMMA include those made from a $C_2$-$C_8$ alkyl acrylate or methacrylate or a $C_3$-$C_8$ cycloalkyl acrylate or methacrylate in combination with methyl methacrylate. In some embodiments, the copolymer of PMMA includes at least one of ethyl acrylate, ethyl methacrylate, butyl acrylate, or butyl methacrylate. In some embodiments, the copolymer is made from starting monomers including methylmethacrylate in a range from 50 weight percent to 90 weight percent (in some embodiments from 60 to 85 weight percent) and a $C_2$-$C_8$ alkyl acrylate or methacrylate or a $C_3$-$C_8$ cycloalkyl acrylate or methacrylate in a range from 10 weight percent to 50 weight percent (in some embodiments from 15 to 40 weight percent), based on the total weight of the monomers. In some of these embodiments, the $C_2$-$C_8$ alkyl acrylate or methacrylate or $C_3$-$C_8$ cycloalkyl acrylate or methacrylate is ethyl acrylate or n-butyl methacrylate. Useful copolymers of PMMA are commercially available, for example, from The Dow Chemical Company, Midland, Mich., under the trade designation "PARALOID" and from Lucite International, Inc., Memphis, Tenn., under the trade designation "PERSPEX" and "ELVACITE". In the *Polymer* article described above, a copolymer available under the trade designation "PARALOID B44" from Dow Chemical Company is reported to be a copolymer made from 70.3 mole percent methyl methacrylate, 28 mole percent ethyl acrylate, and about one mole percent butyl methacrylate and having a weight average molecular weight of 105,000 grams per mole. Also, in this article a copolymer available under the trade designation "PARALOID B48N" from Dow Chemical Company is reported to be a copolymer made from 74.5 mole percent methyl methacrylate and 25.5 mole percent butyl acrylate and having a weight average molecular weight of 184,000 grams per mole. In some embodiments, employing a copolymer of methyl methacrylate and n-butyl methyacrylate in the coating compositions disclosed herein improves the abrasion resistance of the coating composition, as evidenced by reduced haze after exposure to falling sand, described in the Examples, below (e.g., in a comparison of Example 2 and Example 1B).

Given the relatively high molecular weights of the PMMA polymer or copolymer in the coating composition disclosed herein, the PMMA polymer or copolymer in the coating compositions disclosed herein would not be considered to be a "macromer" such as those described in Int. Pat. Appl. Pub. No. WO 98/27171 (Christian). Furthermore, the PMMA polymer or copolymer is typically non-functional. That is, the PMMA polymer or copolymer does not typically contain reactive functional groups such as carboxylic acids, sulfonic acids, amino groups, and polymerizable carbon-carbon double bonds.

The coating composition according to the present disclosure includes an alkylene diacrylate, alkylene dimethacrylate, cycloalkylene diacrylate, or cycloalkylenedimethacrylate. The alkylene diacrylate, alkylene dimethacrylate, cycloalkylene diacrylate, or cycloalkylenedimethacrylate can conveniently be a liquid at room temperature. The alkylene diacrylate or dimethacrylate is typically a $C_2$-$C_{10}$ alkylene diacrylate or dimethacrylate or a $C_4$-$C_6$ cycloalkylene diacrylate or dimethacrylate with no substituents on the alkylene or the cycloalkylene group. The alkylene group in the diacrylate or dimethacrylate, by definition, does not include any heteroatoms or functional groups that interrupt the carbon chain, and the cycloalkylene group in the diacrylate or dimethacrylate, by definition, does not include any heteroatoms in the ring. The alkylene group may be straight chain or branched. Without wanting to be bound by theory, it is believed branching in the alkylene group may result in a cured coating that has a lower modulus, which can increase the abrasion resistance of the cured coating compositions in some embodiments. Examples of useful difunctional acrylates and methacrylates include hexanediol diacrylate, hexanediol dimethacrylate, neopentyl glycol diacrylate, and neopentyl glycol dimethacrylate.

It has been found that the coating compositions disclosed herein have good adhesion to polymeric substrates after curing even in the absence of alkyleneoxy groups in the acrylic monomers. In contrast, some curable protective coatings and inks rely upon alkyleneoxy groups for adhesion or flexibility (see, e.g., U.S. Pat. No. 7,943,681 (Lee et al.) and U.S. Pat. Appl. Pub. No. 2008/0026334 (Williamson et al.). Alkoxy groups in cured coatings may have a tendency to oxidize over time when exposed to UV light. Accordingly, the alkylene or cycloalkylene diacrylates or dimethacrylates are not prepared from alkoxylated diols and are free of ethyleneoxy and propyleneoxy groups.

The alkylene diacrylate, alkylene dimethacrylate, cycloalkylene diacrylate, and/or cycloalkylenedimethacrylate provide at least 80 percent by weight of the monomer in the coating compositions disclosed herein. In some embodiments, the alkylene diacrylate, alkylene dimethacrylate, cycloalkylene diacrylate, and/or cycloalkylenedimethacrylate provide at least 85, 90, 95, 96, 97, 98, 99, or even 100 percent by weight of the monomer. In other words, monomers (e.g., acrylic monomers) other than the alkylene diacrylate, alkylene dimethacrylate, cycloalkylene diacrylate, and/or cycloalkylenedimethacrylate make up not more than (e.g., less than) 20, 15, 10, 5, 4, 3, 2, or 1 percent by weight, based on the total weight of the monomer in the coating composition. In some embodiments, the coating composition may be considered to be substantially free of monomers (e.g., acrylic monomers) other than the alkylene diacrylate, alkylene dimethacrylate, cycloalkylene diacrylate, and/or cycloalkylenedimethacrylate. In some embodiments, the monomer in the coating composition may be considered to consist of an alkylene diacrylate, an alkylene dimethacrylate, a cycloalkylene diacrylate, a cycloalkylenedimethacrylate, or a combination thereof.

The coating compositions disclosed herein therefore do not have significant amounts of monofunctional acrylates or methacrylates. A "significant" amount of monofunctional acrylate or methacrylate is an amount that can reduce crosslink density and reduce abrasion resistance. A "significant" amount of monofunctional acrylate or methacrylate may be considered to be more than about 15 percent by weight, based on the total weight of the monomer in the coating composition. In some embodiments, the monomer includes not more than 15, 10, 5, 4, 3, 2, or 1 percent by weight monofunctional acrylate or methacrylate, based on the total weight of the monomer in the coating composition.

The coating compositions disclosed herein also do not have significant amounts of tri-, tetra-, or higher functional acrylates or methacrylates. A "significant" amount of tri-, tetra-, or higher functional acrylate or methacrylate is an amount that can cause the cured composition to be brittle, have too high of a modulus, or may result in unreacted acrylic or methacrylic functional groups in the cured composition, any of which can compromise the weathering performance of the coating compositions. A "significant" amount of tri-, tetra-, or higher functional acrylate or methacrylate may be considered to be more than about 10 percent by weight, based on the total weight of the monomer in the coating composition. In some embodiments, the monomer includes not more than 7.5, 5, 4, 3, 2, or 1 percent by weight tri-, tetra-, or higher functional acrylate or methacrylate, based on the total weight of the monomer in the coating composition.

When the modulus of the coating is too high, a modulus mismatch after environmental exposure can cause cracking or delamination. An illustration of a high modulus coating is provided in Illustrative Example 1, below. After exposure to only one cycle in a weathering device, a high modulus coating prepared from only 1,6-hexanediol diacrylate and photoinitiator was readily removed from a PMMA substrate using the Adhesion Evaluation described in the Examples, below. Furthermore, Illustrative Example 2 illustrates that a coating prepared from pentaacrylate available from Sartomer USA, LLC (Exton, Pa.) under the trade designation "SR-9041" has more haze upon weathering than Illustrative Example 1, which may be a result of unreacted acrylate groups. Such results may be considered typical for highly crosslinked coatings, such as those that would result if significant amounts of tri-, tetra-, or higher functional acrylate or methacrylates were used in the coating compositions disclosed herein.

In some embodiments, the coating prepared from the coating composition disclosed herein has an elongation of less than 50% (in some embodiments, less than 25% or less than 10%). The coating compositions, in any of their embodiments, generally do not include urethane acrylates, which tend to lower modulus and increase elongation, or include not more than 10, 5, 3, or 1 percent by weight of a urethane acrylate, based on the total weight of the monomer in the coating composition. Also, by definition, the alkylene or cycloalkylene diacrylates or dimethacrylates are not prepared from urethanes and are free of urethane and urea groups.

In the coating compositions disclosed herein, a variety of ratios of the monomer comprising at least one of alkylene diacrylate, alkylene dimethacrylate, cycloalkylene diacrylate, or cycloalkylenedimethacrylate to the poly(methyl methacrylate) polymer or copolymer may be useful. In any of the embodiments of the PMMA polymer or copolymer or the monomer described above, the weight ratio of the monomer comprising at least one of alkylene diacrylate, alkylene dimethacrylate, cycloalkylene diacrylate, or cycloalkylenedimethacrylate to the poly(methyl methacrylate) polymer or copolymer may be in a range from 0.75:1 to 15:1. Also, in any of the aforementioned embodiments, the monomer may be present in the composition in a range from 20 percent by weight to 90 percent by weight (in some embodiments, 20 percent by weight to 80 percent by weight or 23 percent by weight to 75 percent by weight), based on the total weight of the non-volatile components of the composition. The PMMA polymer or copolymer may be present in the composition in a range from 2 percent by weight to 40 percent by weight (in some embodiments, 4 percent by weight to less than 40 percent by weight such as up to 39, 38, or 37 percent by weight) based on the total weight of the non-volatile components of the composition. In some embodiments, for example, embodiments in which the coating composition does not contain any filler, the weight ratio of the monomer comprising at least one of alkylene diacrylate, alkylene dimethacrylate, cycloalkylene diacrylate, or cycloalkylenedimethacrylate to the poly(methyl methacrylate) polymer or copolymer is in a range from 0.75:1 to 5:1, 1:1 to 4:1, or 1.5:1 to 3:1. In any of these embodiments, the monomer may be present in the composition in a range from 40 percent by weight to 90 percent by weight (in some embodiments, 41, 42, 43, 44, or 45 percent by weight to 90 or 80 percent by weight), based on the total weight of the non-volatile components of the composition, and the PMMA polymer or copolymer may be present in the composition in a range from 20 percent by weight to 40 percent by weight (in some embodiments, 20 percent by weight to less than 40 percent by weight such as up to 39, 38, or 37 percent by weight) based on the total weight of the non-volatile components of the composition. In some embodiments, for example, embodiments in which the coating composition includes filler as described in further detail below, the weight ratio of the monomer comprising at least one of alkylene diacrylate, alkylene dimethacrylate, cycloalkylene diacrylate, or cycloalkylenedimethacrylate to the poly(methyl methacrylate) polymer or copolymer is in a range from 0.75:1 to 15:1, 0.75:1 to 12.5:1, or 1:1 to 10:1.

Coating compositions according to the present disclosure adhere well to polymeric substrates and in some embodiments are apparently resistant to harmful effects of coefficient of thermal expansion mismatch or coefficient of humidity expansion mismatch that can occur upon exposure to weathering. In some embodiments, for example, embodiments wherein the weight ratio of the monomer comprising at least one of alkylene diacrylate, alkylene dimethacrylate, cycloalkylene diacrylate, or cycloalkylenedimethacrylate to the PMMA polymer or copolymer is in a range from 1:1 to 10:1, coating compositions according to the present disclosure adhere surprisingly well to polymeric substrates (e.g., acrylic substrates).

The coating composition according to the present disclosure includes a stabilizer against UV light. The stabilizer may be a UV absorber (UVA), a hindered amine light stabilizer (HALS), or a combination thereof. A UVA is typically a compound capable of absorbing or blocking electromagnetic radiation at wavelengths less than 400 nanometers (nm) while remaining substantially transparent at wavelengths greater than 400 nm. UVAs are known to those skilled in the art as being capable of dissipating absorbed light energy from UV rays as heat by reversible intramolecular proton transfer. Such compounds can intervene in the physical and chemical processes of photoinduced degradation. UVAs are typically included in the coating compositions disclosed herein in an amount sufficient to absorb at least 70% (in some embodiments, at least 80%, or greater than 90% of the UV light in the wavelength region from 180 nm to 400 nm). Typically, it is desirable if the UVA is highly soluble in polymers, highly absorptive, photo-permanent and thermally stable in the temperature range from 200° C. to 300° C. The UVA can also be highly suitable if they can be copolymerized with the monomers in the coating composition disclosed herein by free-radical polymerization. In some embodiments, the stabilizer in the coating composition disclosed herein is a red-shifted UVA (RUVA). RUVAs typically have enhanced spectral coverage in the long-wave UV region, enabling it to block the high wavelength UV light that can cause yellowing in polymers. HALS are typically compounds that can scavenge free-radicals, which can result from photodegradation.

Any class of UVA may be useful. Examples of useful classes include benzophenones, benzotriazoles, triazines, cinnamates, cyanoacrylates, dicyano ethylenes, salicylates, oxanilides, and para-aminobenzoates. Suitable UVAs include triazines (e.g., hydrophenyl-substituted triazines such as 2-(4,6-diphenyl-1-3,5-triazin-2-yl)-5-[(hexyl)oxy] phenol and 2-hydroxyphenyl-s-triazine), hydroxybenzophenones, and benzotriazoles (e.g., 5-trifluoromethyl-2-(2-hydroxy-3-alpha-cumyl-5-tert-octylphenyl)-2H-benzotriazole, 2-(2-hydroxy-3,5-di-alpha-cumylphehyl)-2H-benzotriazole, 5-chloro-2-(2-hydroxy-3-tert-butyl-5-methylphenyl)-2H-benzotriazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, and 2-(3-tert-butyl-2-hydroxy-5-methylphenyl)-5-chloro-2H-benzotriazole).

Suitable HALS include decanedioic acid, bis(2,2,6,6-tetramethyl-1-(octyloxy)-4-piperidinyl)ester. Suitable UVAs and HALS include those available, for example, from BASF, Florham Park, N.J., under the trade designations "TINUVIN" and "CHIMASSORB".

In any of the aforementioned embodiments, the coating composition according to the present disclosure can include a free-radical initiator. The free-radical initiator may be a thermal initiator such as an azo compound (e.g., 2,2'-azobisisobutyronitrile (AIBN), 2,2'-azobis(2-methylbutyronitrile), or azo-2-cyanovaleric acid), a hydroperoxide (e.g., cumene, tert-butyl or tert-amyl hydroperoxide), a dialkyl peroxide (e.g., di-tert-butyl or dicumylperoxide), a peroxyester (e.g., tert-butyl perbenzoate or di-tert-butyl peroxyphthalate), and a diacylperoxide (e.g., benzoyl peroxide or lauryl peroxide). The free-radical initiator advantageously may also be a photoinitiator. Examples of useful photoinitiators include benzoin ethers (e.g., benzoin methyl ether or benzoin butyl ether); acetophenone derivatives (e.g., 2,2- dimethoxy-2-phenylacetophenone or 2,2-diethoxyacetophenone); 1-hydroxycyclohexyl phenyl ketone; and acylphosphine oxide derivatives and acylphosphonate derivatives (e.g., bis(2,4,6-trimethylbenzoyl)phenylphosphine oxide, diphenyl-2,4,6-trimethylbenzoylphosphine oxide, isopropoxyphenyl-2,4,6-trimethylbenzoylphosphine oxide, or dimethyl pivaloylphosphonate). In some embodiments, the photoinitiator is not a hexaarylbiimidazole photoinitiator. In some embodiments, the photoinitiator does not contain an oxime ester functional group. Many photoinitiators are available, for examples, from BASF under the trade designation "IRGACURE". When the coating composition disclosed herein includes a photoinitiator, the coating composition can be applied to a substrate and then exposed to light (e.g., UV light) to form a cured coating on the surface of the substrate.

Coating compositions according to the present disclosure may contain organic solvent. Any solvent that can dissolve the PMMA polymer or copolymer may be useful. The non-volatile components (that is, the components other than solvent) may be present in the solvent at any suitable concentration. For example, the non-volatile components may be present in a range from about 5 percent to about 90 percent by weight, from about 30 percent to about 70 percent by weight, or from about 40 percent to 65 percent by weight, based on the total weight of the coating composition). Illustrative examples of suitable solvents include aliphatic and alicyclic hydrocarbons (e.g., hexane, heptane, and cyclohexane), aromatic solvents (e.g., benzene, toluene, and xylene), ethers (e.g., diethyl ether, glyme, diglyme, and diisopropyl ether), esters (e.g., ethyl acetate and butyl acetate), alcohols (e.g., ethanol, isopropyl alcohol, and 1-methoxy-2-propanol), and ketones (e.g., acetone, methyl ethyl ketone, and methyl isobutyl ketone). In some embodiments, the solvent comprises at least one of methyl ethyl ketone, acetone, ethyl acetate, 1-methoxy-2-propanol, isopropanol, and toluene. It is also possible, in some embodiments, for the coating compositions to be essentially free of organic solvent. That is the coating compositions may contain less than 5 percent solvent by weight, based on the total weight of the coating composition.

With or without organic solvent, the coating compositions according to the present disclosure are typically homogeneous solutions or dispersions that are capable of providing interpenetrating networks of the PMMA polymer or copolymer and the monomer after crosslinking. In other words, in a coating composition disclosed herein, neither the PMMA polymer or copolymer nor the monomer comprising at least one of alkylene diacrylate, alkylene dimethacrylate, cycloalkylene diacrylate, or cycloalkylenedimethacrylate is already substantially crosslinked (e.g., before applying it to a substrate and curing it). The PMMA polymer or copolymer is capable of being dissolved in organic solvent or the monomer and therefore may be generally considered to be a linear polymer. And it should be understood that the terms diacrylate and dimethacrylate in reference to the monomer refer to compounds that still have their reactive functional groups and are not already polymerized.

In some embodiments, the coating composition according to the present disclosure includes inorganic particles, which may be inorganic oxide particles. Inorganic oxide particles can include a single oxide such as silica, a combination of oxides, such as silica and aluminum oxide, or a core of an oxide of one type (or a core of a material other than a metal oxide) on which is deposited an oxide of another type. Examples of suitable inorganic oxide particles include silica, zirconia, titania, antimony oxides, alumina, tin oxides, combinations of these or mixed metal oxides of these. In some embodiments, the coating composition disclosed herein includes silica (in some embodiments, having an average particle size of up to 500 nanometers).

The inorganic particles (e.g., silica, zirconia, titania, antimony oxides, alumina, tin oxides, combinations of these or mixed metal oxides of these), in any of the embodiments in which they are included, may have an average particle size of up to 500 nanometers (nm), which may be in a range from 5 nm to 500 nm, 10 nm to 300 nm, 5 nm to 100 nm, or 5 nm to 20 nm. "Average particle size" refers to the maximum cross-sectional dimension of a particle and, in the case of spherical particles, may refer to the diameter. The average particle size of the inorganic particles can be measured using transmission electron microscopy to count the number of inorganic particles of a given size. The inorganic particles may have a substantially monodisperse size distribution or a polymodal distribution obtained by blending two or more substantially monodisperse distributions.

Inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid), e.g., as described in U.S. Pat. No. 5,648,407 (Goetz et al.); U.S. Pat. No. 5,677,050 (Bilkadi et al.) and U.S. Pat. No. 6,299,799 (Craig et al.). Aqueous sols (e.g. of amorphous silica) can be employed. Sols typically contain at least 2 weight percent (wt. %), at least 10 wt. %, at least 15 wt. %, at least 25 wt. %, and often at least 35 wt. % colloidal inorganic oxide particles based on the total weight of the sol. The amount of colloidal inorganic oxide particle is typically no more than 50 wt. % (e.g. no more than 45 wt. %). The size of the particles may be determined, for example, by selection of a particular sol. Alternatively, the inorganic particles can be introduced having a range of particle sizes obtained by grinding inorganic oxide particles to a desired size range. The inorganic oxide particles are typically non-aggregated (substantially discrete), as aggregation can result in optical scattering (haze) or precipitation of the inorganic oxide particles or gelation.

The inorganic particles, including those described in any of the above embodiments, are typically treated with a surface treatment agent. Surface-treating inorganic oxide particles (e.g., those having an average particle size up to 500 nm) can provide a stable dispersion in the coating composition. In some embodiments, the surface of the inorganic particles can be acrylate- or methacrylate-functionalized as described, for example, in U.S. Pat. No. 5,677,050 (Bilkadi et al.), which allows the surface treatment on the particles to react with the monomer in the coating composition disclosed herein. Covalent bonding of the monomer may result in a tougher and more homogeneous polymer/particle network.

In general, a surface treatment agent has a first end that will attach to the particle surface (e.g., covalently, ionically, or through strong physisorption) and a second end that imparts compatibility of the particle with the monomer and/or PMMA polymer or copolymer and/or reacts with monomer during curing. The type of treatment agent (e.g., alcohols, amines, carboxylic acids, sulfonic acids, phosphonic acids, silanes and titanates) may be selected based on, in part, the chemical nature of the metal oxide surface. For example, silanes are useful for silica and other for siliceous fillers. In general, the inorganic oxide particles are treated with the surface treatment agent before the inorganic oxide particles are incorporated into the coating composition disclosed herein. The amount of surface modifier useful for treating the inorganic oxide particles is dependent upon several factors such as particle size, particle type, modifier molecular weight, and modifier type. In some embodiments, approximately a monolayer of modifier is attached to the surface of the particle. The attachment procedure or reaction conditions required also depend on the surface modifier used. For example, silanes may be combined with silica or other siliceous fillers at elevated temperatures under acidic or basic conditions for approximately one to 24 hours. Surface modification may also be carried out according to the methods described in U.S. Pat. No. 7,101,616 (Arney et al.). A combination of surface-treatment agents may be useful. For example, combinations of surface modifying agent can result in lower viscosity of the coating composition containing surface-modified inorganic particles.

In some embodiments, the surface-treatment agent(s) for inorganic particles in the coating compositions disclosed herein comprises at least one of 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl) methyldimethoxysilane, 3-(methacryloyloxy)propyldimethylethoxysilane, 3-(methacryloyloxy) propyldimethylethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, or mercaptopropyltrimethoxysilane. In some embodiments, a combination of such a surface-treatment agent, which can react with the monomer in the coating composition disclosed herein, and a surface-treatment agent having a non-reactive end (e.g., propyltrimethoxysilane or hexyltrimethoxy silane) may be useful.

In some embodiments where the inorganic particles include silica particles having an average size of up to 500 nm (including any of the size ranges described above), the silica particles are surface-modified silica particles having acrylate or methacrylate functional groups on their surfaces, wherein if the surface-modified silica particles have acrylate functional groups on their surfaces, the monomer comprises at least one of the alkylene diacrylate or cycloalkylene diacrylate, and wherein if the surface-modified silica particles have methacrylate functional groups on their surfaces, the monomer comprises at least one of the alkylene dimethacrylate or cycloalkylene dimethacrylate. Without wanting to be bound by theory, it is believed that when the reactive acrylate or methacrylate of the monomer matches that of the silica particles, more covalent bonding between the cured coating and the silica particles takes place depending on reaction conditions (e.g., because of the comparable kinetics of polymerization of the monomer and the surface-treatment). As a result, thermal and humidity expansion effects may be less pronounced in these embodiments, better weathering performance may be achieved.

In some embodiments where the inorganic particles include silica particles having an average size of up to 500 nm (including any of the size ranges described above), the silica particles are surface-modified with PMMA. For example, a methacrylate or acrylate surface-modified silica particle prepared as described above can be combined with methyl methacrylate monomer and a free-radical initiator in a suitable solvent and heated or exposed to light to provide a PMMA surface-modified silica particle. Free radical initiators such as those widely known and used in the art may be used to initiate polymerization of the components. Examples of free-radical initiators include azo compounds (e.g., 2,2'-azobisisobutyronitrile (AIBN), 2,2'-azobis(2-methylbutyronitrile), or azo-2-cyanovaleric acid), hydroperoxides (e.g., cumene, tert-butyl or tert-amyl hydroperoxide), dialkyl peroxides (e.g., di-tert-butyl or dicumylperoxide), peroxyesters (e.g., tert-butyl perbenzoate or di-tert-butyl peroxyphthalate), diacylperoxides (e.g., benzoyl peroxide or lauryl peroxide). Temperature and solvent for a particular use can be selected by those skilled in the art based on considerations such as the solubility of reagents, temperature required for the use of a particular initiator, and desired molecular weight. Generally suitable temperatures are in a range from about 30° C. to about 200° C. (in some embodiments, from about 40° C. to about 100° C., or even from about 50° C. to about 80° C.). The PMMA grafted on the silica particles is compatible with the PMMA polymer or copolymer and the monomers. As a result, coatings made from coating compositions including the PMMA-grafted silica particles are stable after extended weathering, and, in some embodiments, have good abrasion resistance.

Figure 3:
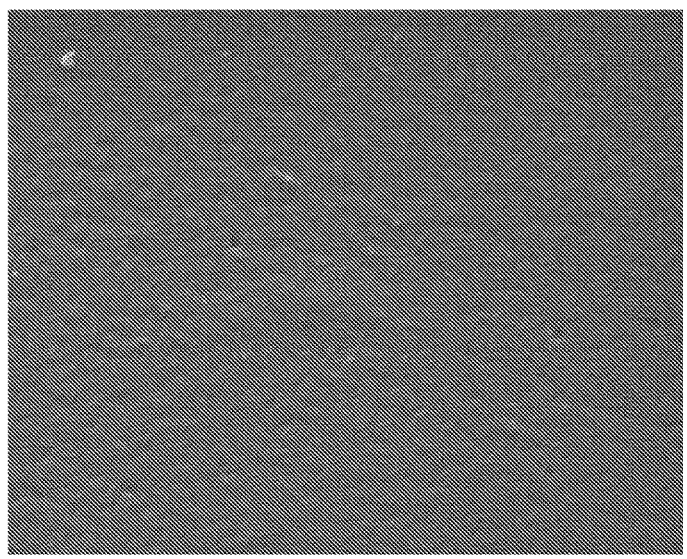
FIG. 3 is a scanning electron micrograph at 60,000× magnification of a representative surface of Example 3B after accelerated weathering.

In some embodiments, coatings made from coating compositions including the PMMA-grafted silica particles are more stable after extended weathering than coatings made from coating compositions including silica particles surface-modified with methacrylic groups. For example, FIG. 1 shows a scanning electron micrograph of Example 1C, which is a cured coating that includes silica particles that were surfaced-modified with methacrylic groups, after it has been exposed to a total UV does of 746 MJ/m$^2$. For comparison, FIG. 3 shows scanning electron micrograph of Example 3A, which is a cured coating that includes PMMA-grafted silica particles, after it has been exposed to a total UV does of 746 MJ/m$^2$. Also, water contact angle measurements for Example 3A decreased much less than water contact angles for Example 1C after exposure to a total UV does of 746 MJ/m$^2$ or more.

For any of the embodiments of the coating composition according to the present disclosure described above, the coating composition may include a silicone-containing acrylic copolymer. The silicone-containing acrylic copolymer may be a copolymer of a silicone acrylate or methacrylate and a $C_1$-$C_8$ alkyl acrylate or methacrylate or a $C_3$-$C_8$ cycloalkyl acrylate or methacrylate, for example. The silicone-containing acrylic copolymer may be a copolymer of a $C_1$-$C_8$ alkyl acrylate or methacrylate or a $C_3$-$C_8$ cycloalkyl acrylate or methacrylate, for example, and a silicone containing chain-transfer agent (e.g, a mercaptan). When a silicone chain-transfer reagent is used, the resulting copolymer can contain more alkyl acrylic (e.g., PMMA) side chains than when a silicone acrylate or methacrylate monomer is used in the polymerization. The silicone-containing acrylate or methacrylate or silicone-containing chain-transfer agent can have a weight average molecular weight of at least 1000 (in some embodiments, at least 2000, 2500, 5000, or 7500) grams per mole and up to about 20,000 (in some embodiments, up to 17,500 or 15,000) grams per mole. In some embodiments, the silicone-containing chain-transfer agent is a mercapto-functional silicone having the following formula:

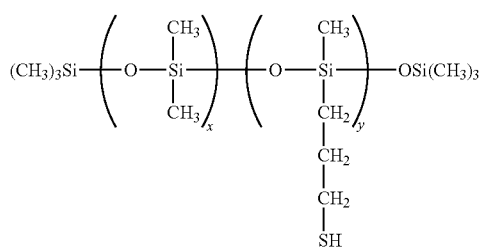

wherein x is in a range from 50 to 150, and y is in a range from 1 to 10. Mercpato-functional silicones having this structure can be obtained commercially, for example, from Shin-Etzu Silicones of America (Akron, Ohio) under the trade designation "KF-2001", which is reported to have a molecular weight of 8000 grams per mole and a mercapto group equivalent weight of about 1,900 grams per mole. In some embodiments, the silicone acrylate is represented by formula $CH_2\!=\!C(CH_3)\!-\!C(O)\!-\!O\!-\!(CH_2)_3\!-\!Si(CH_3)_2\!-\![OSi(CH_3)_2]_n\!-\!O\!-\!Si(CH_3)_2\!-\!(CH_2)_3\!-\!CH_3$ with a molecular weight of about 10,000 g/mole. Such silicone acrylates can be prepared by the method described in U.S. Pat. No. 4,728,571 (Clemens et al.), and some are commercially available, for example, from Shin-Etsu Silicones of America, Inc, Akron, Ohio, under the trade designation "X-22-2406". Still other silicone acrylates include silicone polyether acrylates available, for example, from Evonik Tego Chemie GmbH, Essen Germany, under the trade designation "TEGO RAD 2250".

Silicone-containing acrylic copolymers useful in some embodiments of the coating compositions disclosed here can be prepared, for example, by combining a silicone acrylate or a methacrylate silicone-containing chain-transfer agent and a $C_1$-$C_8$ alkyl acrylate or methacrylate or a $C_3$-$C_8$ cycloalkyl acrylate or methacrylate in a suitable solvent and heating or photopolymerizing in the presence of a free radical initiator. Examples of useful thermal free-radical initiators include azo compounds (e.g., 2,2'-azobisisobutyronitrile (AIBN), 2,2'-azobis(2-methylbutyronitrile), or azo-2-cyanovaleric acid), hydroperoxides (e.g., cumene, tert-butyl or tert-amyl hydroperoxide), dialkyl peroxides (e.g., di-tert-butyl or dicumylperoxide), peroxyesters (e.g., tert-butyl perbenzoate or di-tert-butyl peroxyphthalate), diacylperoxides (e.g., benzoyl peroxide or lauryl peroxide). Temperature and solvent for a particular use can be selected by those skilled in the art based on considerations such as the solubility of reagents, temperature required for the use of a particular initiator, and desired molecular weight. Generally suitable temperatures are in a range from about 30° C. to about 200° C. (in some embodiments, from about 40° C. to about 100° C., or even from about 50° C. to about 80° C.). For ease of incorporation into the coating composition disclosed herein, it may be desirable that the silicone-containing acrylic copolymer has an inherent viscosity in a range from 0.15 to 0.50 dl/gram, as determined by a Cannon-Fenske viscometer. In embodiments wherein the coating composition contains a silicone-containing acrylic copolymer, the resultant coating typically is more easily cleaned than a control in which the silicone-containing acrylic copolymer is not included, as evaluated by the "Cleanability" evaluation method provided in the Examples, below. For example, a comparison of Example 1E which includes PMMA copolymer and HDDA with either Example 4 or Example 5, which include the same PMMA copolymer and HDDA along with a silicone-containing acrylic monomer, the amount of haze measured for Example 1E increases more after the "Cleanability" evaluation than the amount of haze measured for either Examples 4- or 5.

In some embodiments, the coating compositions disclosed herein that have a silicone-containing acrylic monomer provide a water contact angle of at least 90 degrees, in some embodiments, at least 95 degrees or 100 degrees before exposure to any accelerated weathering.

The coating compositions may also include other additives, depending on the desired application of the coating. Optional additives include colorants, slip modifiers, anti-foaming agents, flow or other rheology control agents, antioxidants, photoinitiator stabilizers, gloss agents, fungicides, bactericides, leveling agents, antistatic agents, and dispersants, for example. In some embodiments, for example, in embodiments in which an optically clear coating is desirable, the coating compositions include no colorants such as pigments.

The present disclosure provides a substrate coated with the coating composition as in any of the embodiments described above. The substrate may be a polymeric film or sheet. Typical polymeric materials include acrylics, polyesters, polycarbonates, cyclic olefin copolymers, silicones, and fluoropolymers. Additional examples of polymeric materials include polyester (e.g., polyethylene terephthalate, polybutylene terephthalate), cyclic olefin co-polymer (COC), fluoropolymers (e.g., ethylene tetrafluorethylene, polyvinylidene fluoride (PVDF), and THV), polycarbonate, allyldiglycol carbonate, polyacrylates such as polymethyl methacrylate, polystyrene, polysulfone, polyethersulfone, homo-epoxy polymers, epoxy addition polymers with polydiamines, polydithiols, polyethylene copolymers, fluorinated surfaces, and cellulose esters (e.g., acetate and butyrate). In some embodiments, the substrate is flexible and made from polyesters (e.g., polyethylene terephthalate (PET)), cyclic olefin co-polymer (COC), polyolefins (e.g., PP (polypropylene) or PE (polyethylene)), or PVC (polyvinyl chloride). In some embodiments, the substrate comprises PMMA. In some embodiments, the substrate comprises PET. In some embodiments, the substrate is a blend of an acrylic polymer and another polymer (e.g., PVDF). In some embodiments, the substrate is a multi-layer optical film (that is, having an optical layer stack), for example, such as those described in U.S. Pat. App. Pub. Nos. 2009/0283144 (Hebrink et al.) and 2012/0011850 (Hebrink et al.). In some of these embodiments, the multi-layer optical film reflects at least a major portion of the average light across the range of wavelengths that corresponds with the absorption bandwidth of a selected photovoltaic cell and does not reflect a major portion of the light that is outside the absorption bandwidth of the photovoltaic cell. In other embodiments, the multi-layer optical film may be combined with a metal layer to provide a broadband reflector. In some embodiments, the substrate is a mirror film, which may have a polymer layer (or layers) and a metal layer. In some of these embodiments, the polymer layer is a PMMA layer. In some of these embodiments, the coating composition is applied to the PMMA layer. In some embodiments, the substrate is a Fresnel lens (e.g., an acrylic Fresnel lens). In some embodiments, the substrate is a window film. In some embodiments, the substrate is a retroreflective sheet.

The substrate can be formed into a film using conventional filmmaking techniques such as extrusion of the substrate resin into a film and optional uniaxial or biaxial orientation of the extruded film. Suitable commercial films include polymethyl methacrylate (PMMA) films available, for example, under trade designation "SOLATUF" from Rowland Industries, Wallingford, Conn., and polycarbonate (PC) films available under trade designation "BAYFOL" or "MAKROFOL" from Bayer Material Science.

For any of the embodiments of the substrate described above, the major surface of the polymeric substrate to be coated with the coating composition disclosed herein can be treated to improve adhesion to the coating. Useful surface treatments include electrical discharge in the presence of a suitable reactive or non-reactive atmosphere (e.g., plasma, glow discharge, corona discharge, dielectric barrier discharge or atmospheric pressure discharge); chemical pretreatment; UV flash lamp pretreatment; or flame pretreatment. The primer can be applied as the substrate is being made or in a separate process. In some embodiments, the substrate is corona treated before the coating composition disclosed herein is applied. In some of these embodiments, the corona treatment is a nitrogen corona treatment with any suitable power (e.g., 0.5 joules/square centimeter). The nitrogen corona treatment can be carried out, for example, as described in U.S. Pat. No. 7,442,442 (Strobel et al.).

To make a coated article according to the present disclosure, a surface of the polymeric substrate, which may be treated (e.g., corona treated) as described above, is contacted with a coating composition disclosed herein. The surface of the polymeric substrate can be contacted using conventional coating techniques, for example, brush, bar, roll, wipe, curtain, rotogravure, spray, or dip coating techniques. In some embodiments, the coating composition disclosed herein is provided on the surface of the polymeric substrate using microgravure coating.

Coating composition may be applied to the polymeric substrate in any useful thickness to provide a continuous coating. That is, it is generally desirable for the coating to form a layer over the polymeric substrate such that the layer does not have any breaks or gaps in the area that is coated, which may be the entire surface of the substrate. In some embodiments, the coating composition is applied such that the coating (after any drying described below) has a thickness of at least 8 micrometers. In some embodiments, the thickness of the coating on the substrate may be at least 10, 15, or 20 micrometers and up to about 50 micrometers.

In embodiments wherein the coating composition includes organic solvents, the solvent may be at least partially removed by drying. Drying can be carried out at room temperature over time, or an elevated temperature may be useful. In some embodiments, an article that has been contacted with the coating composition disclosed herein can be oven-dried at a temperature of at least 50° C., 60° C., 70° C., or 80° C., up to a temperature of about 120° C., depending on the temperature limits of the selected substrate. When the coated article is made by continuous film processing, the film may be directed through an oven having a series of temperature zones, which may be at the same temperature or successively higher temperatures.

In many embodiments, the coating composition disclosed herein can be cured to provide a coating on the surface of the polymeric substrate by exposure of the coating composition to actinic radiation. In some embodiments, a photoinitiator as described above is present, and the coating composition is irradiated with ultraviolet radiation from a lamp, in some embodiments, in an inert atmosphere such as nitrogen. If electron-beam radiation is used for curing, a photoinitiator need not be used. The amount of actinic radiation useful for curing depends on a number of factors including the amount and type of reactants involved, the energy source, web speed, the distance from the energy source, and the thickness of the coating composition. Ultraviolet radiation may be useful to provide from about 0.1 to about 10 Joules per square centimeter total energy exposure, and useful amounts of electron beam radiation provide a total energy exposure in a range from less than 1 megarad to 100 megarads or more (in some embodiments, in a range from 1 to 10 megarads). Exposure times may be in a range from less than about one second up to ten minutes or more.

In some embodiments, the coating composition disclosed herein can be cured to provide a coating on the surface of the polymeric substrate by heating the substrate with the applied coating composition. In these embodiments, a thermal free-radical initiator as described above is present, and the coating composition is heated, in some embodiments, in an inert atmosphere such as nitrogen. Temperature and solvent for a particular coating composition can be selected by those skilled in the art based on considerations such as the temperature required for the use of a particular initiator, the desired molecular weight, and the temperature limits of the substrate. Generally suitable temperatures are in a range from about 30° C. to about 120° C. (in some embodiments, from about 40° C. to about 100° C., or even from about 50° C. to about 80° C.).

In some embodiments of the coated articles according to the present disclosure, there are first and second coatings on the substrate. The first coating is prepared from the coating compositions according to any of the embodiments of the coating compositions described above, and the second coating can be on top of the first coating. The second coating may be useful, for example, for enhancing the cleanability of the coated article or providing the coated article with self-cleaning properties.

In some embodiments, the second coating comprises silica particles having an average particle size of up to 500 nm, 300 nm, 150 nm, or 100 nm. For example, the silica nanoparticles may be in a range from 1 nm to 500 nm, 1 nm to 300 nm, 1 nm to 100 nm, 2 nm to 40 nm, or 2 nm to 25 nm. The second coating may be applied from a second coating composition, which, in some embodiments, includes an aqueous continuous liquid phase and dispersed silica particles. In some embodiments, for example, in embodiments in which at least a portion of the silica particles have a size in a range from 2 nm to 40 nm, these silica coating compositions, when acidified, can be coated directly onto the relatively more hydrophobic first coating disclosed herein without requiring either organic solvents or surfactants, although in other embodiments, such solvents and surfactants may be useful. The second coating compositions are coatable on the first coating, for example, when they are acidified with HCl to pH=2 to 3, and even to 5 in some embodiments. However, the second coating compositions may bead up on the first coating at neutral or basic pH. Not wishing to bound by theory, it is believed that agglomerates of the silica particles are formed by through acid-catalyzed siloxane bonding in combination with protonated silanol groups at the particle surfaces, and these agglomerates can be coated onto the first coating.

Aqueous silica sols, including a variety of colloidal sizes, are commercially available as described above. Useful silica particles may be spherical or non-spherical. Useful non-spherical silica particles are available, for example, in aqueous suspension under the trade designation "SNOWTEX" by Nissan Chemical Industries (Tokyo, Japan). In some embodiments, the second coating composition may have an average particle size of less than 40 nm. In some embodiments, the second coating composition may have an average particle size of less than 100 nm. Mixtures of different-sized silica particles may be useful. For example, at least a portion of the silica particles may have an average particle size in a range from 2 nm to 40 nm (in some embodiments, 2 nm to 25 nm), and other silica particles may be present (e.g., having an average particle size of up to 150 nm or 100 nm).

The second coating composition typically contains an acid having a pKa ($H_2O$) of ≤3.5, <2.5, or in some embodiments less than 1. Useful acids include both organic and inorganic acids, and examples include oxalic acid, citric acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, and $CH_3SO_2OH$. In some embodiments, the acid is selected from the group consisting of HCl, $HNO_3$, $H_2SO_4$, $H_3PO_4$, and combinations thereof. In some embodiments, a mixture of an organic and inorganic acid may be useful.

The second compositions may be coated on the first coating using conventional coating techniques, such as brush, bar, roll, wipe, curtain, rotogravure, spray, or dip coating techniques. The second coating composition generally contains between about 0.1 and 10 weight percent solids. For any of the coating methods for the second coating composition, the wet coating thickness can be, for example, in a range of 0.5 to 300 micrometers, or 1 to 250 micrometers. The dry second coating thickness is dependent upon the particular composition that is coated, but in general the average thickness of the dry composition coating thickness is between 0.002 to 5 micrometers, in some embodiments, between 0.005 to 1 micrometer. Dry coating layer thicknesses may be higher, as high as a few microns or up to as much as 100 microns thick, depending on the application. However, thinner second coatings still provide useful resistance to dust accumulation, as described in Illustrative Example 3, below.

In some embodiments, an article that has been contacted with the second coating composition can be oven-dried at a temperature of at least 50° C., 60° C., 70° C., or 80° C. and up to 120° C. depending on the temperature limits of the selected substrate. When the coated article is made by continuous film processing, the film may be directed through an oven having a series of temperature zones, which may be at the same temperature or successively higher temperatures. Generally, the article that has been coated with the second coating composition is heated for a time up to 30 minutes, up to 20 minutes, up to 10 minutes, or up to 5 minutes. The substrate surface may then be cooled rapidly, or variations of heating and cooling may be used to temper the substrate.

In some embodiments, the second coating composition may include a surfactant. In some embodiments, the second coating composition may include a coupling agent such as a tetralkoxy compound (e.g., tetraethylorthosilicate) or an oligomeric coupling agent (e.g., poly(diethoxysiloxane). In some embodiments, the coating composition comprises an organic polymer binder. For example, the coating composition may comprise a polymer latex, such as aliphatic polyurethane. In another example, the coating composition may comprise a water-soluble copolymer of acrylic acid and an acrylamide, or a salt thereof. The weight ratio of the silica particles to the polymer binder is generally at least 1:1, and in specific examples it ranges from 4:1 to 9:1. In embodiments that include an organic polymer binder, the pH of the second coating composition may be 5 or greater.

In some embodiments, articles disclosed herein that have a second coating including silica particles with an average particle size of up to 500 nm, 300 nm, 150 nm, or 100 nm provide a water contact angle of up to 20 degrees, in some embodiments, up to 15 degrees or 10 degrees. Further details about useful second coating compositions including silica particles having an average particle size of up to 500 nanometers and methods of applying them can be found, for example, in International Pat. Appl. Pub. Nos. 2012/047867 (Brown et al.) and 2012/047877 (Brown et al.), both incorporated herein by reference.

A common problem in desert locations is accumulation of dust on the exposed surfaces of the optical components of a solar energy system. Air-borne desert dust typically substantially comprises particles with diameters no larger than 100 micrometers, and often substantially comprises particles with diameters no larger than 50 micrometers. Dust typically reduces optical performance by causing incident light to scatter, rather than being concentrated or reflected by the solar optical component onto the intended solar energy conversion device. Typically, over a period of time, the electricity produced by the solar energy system decreases as dust accumulates, resulting in losses of from 5 to 40% relative to the originally installed, clean system. As the designed output of the installation increases, losses due to dust are increasingly unacceptable. For the largest installations, operators may be forced to clean their optical surfaces, often by methods that require the use of water. Water is expensive and scarce in most desert locations. Thus, there is a need to provide solar optical components that will maintain optical performance in the presence of desert dust. As suggested by Illustrative Example 3, below, articles coated with a first coating and a second coating disclosed herein can maintain their optical properties upon exposure to dust, indicating dust tends not to accumulate on these articles. Furthermore, as shown in Example 6, below, the second coating adheres unexpectedly well to the first coating, even after exposure to weathering.

In some embodiments, coating compositions and coatings therefrom according to the present disclosure are transmissive to visible and infrared light. The term "transmissive to visible and infrared light" as used herein can mean having an average transmission over the visible and infrared portion of the spectrum of at least about 75% (in some embodiments at least about 80, 85, 90, 92, 95, 97, or 98%) measured along the normal axis. In some embodiments, the coating compositions and/or coatings therefrom have an average transmission over a range of 400 nm to 1400 nm of at least about 75% (in some embodiments at least about 80, 85, 90, 92, 95, 97, or 98%).

Some Embodiments of the Disclosure

In a first embodiment, the present disclosure provides a coating composition comprising:

a poly(methyl methacrylate) polymer or copolymer having a weight average molecular weight of at least 50,000 grams per mole;

monomer comprising at least one of an alkylene diacrylate, alkylene dimethacrylate, cycloalkylene diacrylate, or cycloalkylenedimethacrylate, wherein the at least one of an alkylene diacrylate, alkylene dimethacrylate, cycloalkylene diacrylate, or cycloalkylenedimethacrylate provides at least 80 percent by weight of the monomer; and a stabilizer against ultraviolet light.

In a second embodiment, the present disclosure provides the coating composition of the first embodiment, wherein the poly(methyl methacrylate) polymer or copolymer has a weight average molecular weight of at least 75,000 grams per mole.

In a third embodiment, the present disclosure provides the coating composition of the first or second embodiment, wherein the poly(methyl methacrylate) polymer or copolymer has a weight average molecular weight of at least 100,000 grams per mole or at least 120,000 grams per mole.

In a fourth embodiment, the present disclosure provides the coating composition of any one of the first to third embodiments, wherein the poly(methyl methacrylate) polymer or copolymer is poly(methyl methacrylate) or a copolymer of methyl methacrylate and at least one of a $C_2$-$C_8$ alkyl acrylate or methacrylate or a $C_3$-$C_8$ cycloalkyl acrylate or methacrylate.

In a fifth embodiment, the present disclosure provides the coating composition of the fourth embodiment, wherein the poly(methyl methacrylate) polymer or copolymer is a copolymer of methyl methacrylate and at least one of ethyl acrylate, ethyl methacrylate, butyl acrylate, or butyl methacrylate.

In a sixth embodiment, the present disclosure provides the coating composition of any one of the first to fifth embodiments, wherein the monomer comprises at least one of a $C_{2-10}$alkylene diacrylate, $C_{2-10}$alkylene dimethacrylate, $C_{4-6}$cycloalkylene diacrylate, or $C_{4-6}$cycloalkylenedimethacrylate.

In a seventh embodiment, the present disclosure provides the coating composition of any one of the first to sixth embodiments, wherein the monomer comprises at least one of 1,6-hexanediol diacrylate, 1,6-hexanediol dimethacrylate, or neopentyl glycol dimethacrylate.

In an eighth embodiment, the present disclosure provides the coating composition of any one of the first to seventh embodiments, further comprising a silicone-containing acrylic copolymer.

In a ninth embodiment, the present disclosure provides the coating composition of any one of the first to eighth embodiments, further comprising inorganic filler.

In a tenth embodiment, the present disclosure provides the coating composition of any one of the first to eighth embodiments, further comprising silica particles having an average particle size of up to 500 nanometers, 300 nanometers, 150 nanometers, or 100 nanometers.

In an eleventh embodiment, the present disclosure provides the coating composition of the tenth embodiment, wherein the silica particles are surface-modified silica particles having acrylate or methacrylate functional groups on their surfaces.

In a twelfth embodiment, the present disclosure provides the coating composition of the eleventh embodiment, wherein if the surface-modified silica particles have acrylate functional groups on their surfaces, the monomer comprises at least one of the alkylene diacrylate or cycloalkylene diacrylate, and wherein if the surface-modified silica particles have methacrylate functional groups on their surfaces, the monomer comprises at least one of the alkylene dimethacrylate or cycloalkylene dimethacrylate.

In a thirteenth embodiment, the present disclosure provides the coating composition of the tenth embodiment, wherein the silica particles are modified with poly(methyl methacrylate).

In a fourteenth embodiment, the present disclosure provides the coating composition of any one of the first to thirteenth embodiments, wherein the ratio of the monomer comprising at least one of alkylene diacrylate, alkylene dimethacrylate, cycloalkylene diacrylate, or cycloalkylenedimethacrylate to the poly(methyl methacrylate) polymer or copolymer is in a range from 0.75:1 to 10:1.

In a fifteenth embodiment, the present disclosure provides the coating composition of any one of the first to fourteenth embodiments, further comprising organic solvent.

In a sixteenth embodiment, the present disclosure provides the coating composition of the fifteenth embodiment, wherein the organic solvent comprises at least one of methyl ethyl ketone, 1-methoxy-2-propanol, isopropanol, toluene, acetone, or ethyl acetate.

In a seventeenth embodiment, the present disclosure provides the coating composition of any one of the first to sixteenth embodiments, wherein the stabilizer against ultraviolet light comprises at least one of a benzotriazole, a benzophenone, a triazine, or a hindered-amine light stabilizer.

In an eighteenth embodiment, the present disclosure provides the coating composition of any one of the first to seventeenth embodiments, further comprising a photoinitiator.

In a nineteenth embodiment, the present disclosure provides the coating composition of any one of the first to eighteenth embodiments, wherein the coating composition does not comprise a hexaarylbiimidazole photoinitiator, and/or wherein the coating composition does not comprise a photoinitiator containing an oxime ester functional group.

In a twentieth embodiment, the present disclosure provides an article comprising a substrate and a first coating on a surface of the substrate, wherein the first coating is obtained by curing the coating composition of any one of the first to nineteenth embodiments.

In a twenty-first embodiment, the present disclosure provides the article of the twentieth embodiment, wherein the substrate is a polymeric substrate.

In a twenty-second embodiment, the present disclosure provides the article of the twentieth or twenty-first embodiment, wherein the substrate is a thermoplastic substrate comprising at least one of an acrylic, a polyester, a polycarbonate, or a blend of polyvinylidene fluoride and poly(methyl methacrylate).

In a twenty-third embodiment, the present disclosure provides the article of any one of the twentieth to twenty-second embodiments, wherein the surface of the substrate is primed.

In a twenty-fourth embodiment, the present disclosure provides the article of the twenty-third embodiment, wherein the surface of the substrate is nitrogen-corona treated.

In a twenty-fifth embodiment, the present disclosure provides the article of any one of the twentieth to twenty-fourth embodiments, wherein the substrate is an acrylic mirror film, a multi-layer optical film, a lens, retroreflective sheeting, or a window film.

In a twenty-sixth embodiment, the present disclosure provides the article of the twenty-fifth embodiment, wherein the substrate is an acrylic mirror film or a multi-layer optical film.

In a twenty-seventh embodiment, the present disclosure provides the article of any one of the twentieth to twenty-sixth embodiments, further comprising a second coating disposed on the first coating, wherein the second coating comprises silica particles having an average particle size of up to 500 nanometers, 300 nanometers, 150 nanometers, or 100 nanometers.

In a twenty-eighth embodiment, the present disclosure provides the article of the twenty-seventh embodiment, wherein at least a portion of the silica particles have an average particle size up to 40 nm.

In a twenty-ninth embodiment, the present disclosure provides the article of any one of the twentieth to twenty-eighth embodiments, wherein the first coating has a thickness of at least 8 micrometers.

In a thirtieth embodiment, the present disclosure provides the article of any one of the twentieth to twenty-ninth embodiments, wherein the first coating is transmissive to visible and infrared light.

In a thirty-first embodiment, the present disclosure provides the article of any one of the twentieth to thirtieth embodiments, wherein the article is exposed to sunlight.

In a thirty-second embodiment, the present disclosure provides a method of making an article, the method comprising:

contacting a surface of a substrate with the coating composition of any one of the first to nineteenth embodiments;

removing organic solvent, if present, from the coating composition; and exposing the coating composition to actinic radiation to provide a first coating on the surface of the substrate.

In a thirty-third embodiment, the present disclosure provides the method of the thirty-second embodiment, further comprising physically or chemically priming the surface of the substrate before contacting the surface of the substrate with the coating composition.

In a thirty-fourth embodiment, the present disclosure provides the method of the thirty-second or thirty-third embodiment, wherein the substrate is a polymeric substrate.

In a thirty-fifth embodiment, the present disclosure provides the method of any one of the thirty-second to thirty-fourth embodiments, wherein the substrate is a thermoplastic substrate comprising at least one of an acrylic, a polyester, a polycarbonate, or a blend of polyvinylidene fluoride and poly(methyl methacrylate).

In a thirty-sixth embodiment, the present disclosure provides the method of any one of the thirty-second to thirty-fifth embodiments, wherein the substrate is an acrylic mirror film, a multi-layer optical film, a lens, retroreflective sheeting, or a window film.

In a thirty-seventh embodiment, the present disclosure provides the method of any one of the thirty-second to thirty-sixth embodiments, wherein the substrate is an acrylic mirror film and/or comprises poly(methyl methacrylate).

In a thirty-eighth embodiment, the present disclosure provides the method of the thirty-seventh embodiment, further comprising priming the substrate with a nitrogen corona treatment.

In a thirty-ninth embodiment, the present disclosure provides the method of any one of the thirty-second to thirty-eighth embodiments, further comprising contacting the first coating with a second coating composition, wherein the second coating composition has a pH of up to 5 and comprises water and silica particles having an average particle size of up to 500 nanometers, 300 nanometers, 150 nanometers, or 100 nanometers dispersed in the water.

In a fortieth embodiment, the present disclosure provides the method of the thirty-ninth embodiment, wherein at least some of the silica particles have an average particle size of up to 40 nanometers.

In a forty-first embodiment, the present disclosure provides the method of the thirty-ninth or fortieth embodiment, further comprising drying the second coating composition to remove at least some of the water.

In order that this disclosure can be more fully understood, the following examples are set forth. It should be understood that these examples are for illustrative purposes only, and are not to be construed as limiting this disclosure in any manner.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

| | Materials |
|---|---|
| "PARALOID B44" | "PARALOID ™ B-44" 100% solid thermoplastic acrylic resin (methyl methacrylate copolymer), commercially available from Dow Chemical Company, Midland, Mich. |
| "PARALOID B48N" | "PARALOID ™ B-48N" 100% solid thermoplastic acrylic resin (methyl methacrylate and butyl acrylate copolymer), commercially available from Dow Chemical Company |
| "KF-2001" | Mercapto-functional silicone, commercially available as "KF-2001" from Shin-Etsu Silicones of America, Inc., Akron, Ohio |
| SiMac | A polydimethyl siloxane macromonomer having formula: $CH_2=C(CH_3)-C(O)-O-(CH_2)_3-Si(CH_3)_2-[OSi(CH_3)_2]_n-O-Si(CH_3)_2-(CH_2)_3-CH_3$ with a molecular weight of about 10,000 g/mole made as described in U.S. Pat. No. 4,728,571 as "C-3B". |
| Sol B | Surface functionalized 20 nm silica sol prepared as 44% solids in 1-methoxy-2-propanol according to the method described in U.S. Pat. No. 7,101,616 under "Preparation of a Methacryloxysilane Surface Functionalized Silica Sol (Sol B)". |
| "NALCO 1050" | Aqueous anionic colloidal silica sol with average particle diameter of 20 nm, commercially available from Nalco Company, Naperville, IL. |
| "NALCO 8699" | NALCO 8699 available as a silica sol with mean particle size of 2-4 nanometers, commercially available from Nalco Company |
| HDDA | 1,6-Hexanediol diacrylate, commercially available from Sartomer USA, LLC, Exton, PA, under the trade designation "SR238B" |
| HDDMA | 1,6-Hexanediol dimethacrylate, commercially available from Sartomer USA, LLC, under the trade designation "SR239A" |
| NGDMA | Neopentyl glycol dimethacrylate, commercially available from Sartomer USA, LLC, under the trade designation "SR248" |
| TDDA | 1,6 Tricyclodecane dimethanol diacrylate, commercially available from Sartomer USA, LLC, under the trade designation "SR833S" |
| "SR-9041" | Pentaacrylate ester commercially available from Sartomer USA, LLC, under the trade designation "SR-9041" |
| PMMA film | Poly(methyl methacrylate) film (91 micron (3.6 mil)) available under the trade designation "CP-82" commercially available from Plaskolite West Inc, Compton, CA that was then further processed by adding additional UV stabilizer. |
| PM | 1-methoxy-2 propanol, commercially available under the trade designation "DOWANOL PM" from Dow Chemical Company |
| "IRGACURE 184" | "IRGACURE ® 184" 1-Hydroxy-cyclohexyl-phenyl-ketone photoinitiator, available from BASF, Florham Park, NJ. |
| "IRGACURE 819" | "IRGACURE ® 819" Phosphine oxide, phenyl bis (2,4,6-trimethyl benzoyl) photoinitiator, commercially available from BASF |
| "TINUVIN 479" | "TINUVIN ® 479" 2-hydroxyphenyl-s-triazine ultraviolet absorber, available from BASF |
| "TINUVIN 123" | "TINUVIN ® 123" Decanedioic acid, bis(2,2,6,6-tetramethyl-1-(octyloxy)-4-piperidinyl)ester hindered amine light stabilizer, commercially available from BASF |
| MMA | Methyl methacrylate commercially available from Rohm and Haas Chemicals, a subsidiary of The Dow Chemical Company, Philadelphia, PA. |
| "VAZO 67" | "VAZO ® 67" 2,2'-Azodi(2-methylbutyronitrile), free radical initiator, commercially available from E. I. du Pont de Nemours and Company, Wilmington DE |
| SPUT slurry | 2 weight percent mixture of 3M Standard Carpet Test soil (SPS-2001, 98-0211-3494-9) in de-ionized water. |

| Materials | |
|---|---|
| Arizona Test Dust | Arizona Test Dust, 0-70 micron, commercially available from PTI (Powder Technology, Inc.), Burnsville, MN. |

Preparations

PMMA-Grafted Silica

The grafted samples were prepared by combining Sol B (6.9 grams (g) of 44% solids in 1-methoxy-2-propanol), methyl methacrylate (27.0 g), free radical initiator "VAZO 67" (0.15 g), and 2-butanone (66.1 g) in a glass bottle. The bottle was purged with nitrogen and sealed. The bottle of solution was tumbled in a 65° C. water bath for 24 hours (hrs). The bottle of solution was allowed to cool to ambient temperature (22° C.). The solids were determined to be 30.75% by weight loss of samples held for 60 minutes (min) at 105° C.

Silicone-Containing Acrylic Copolymer A

A silicone acrylic copolymer was prepared by combining mercapto-functional silicone "KF-2001" (22.5 g), methyl methacrylate (67.5 g), free radical initiator "VAZO 67" (0.45 g), and ethyl acetate (210 g) in a glass bottle. The bottle was purged with nitrogen and sealed. The bottle of solution was tumbled in a 65° C. water bath for 60 hrs. The bottle of solution was allowed to cool to ambient temperature (22° C.). The solids were determined to be 29.6% by weight loss of samples held for 60 min at 105° C. The inherent viscosity (IV) was measured by conventional means using a Cannon-Fenske #50 viscometer in a water bath controlled at 27° C. to measure the flow time of 10 milliliters (mL) of the polymer solution (0.5 g of polymer per deciliter in tetrahydrofuran) and determined to be 0.18 deciliters per gram (dl/g).

Silicone-Containing Acrylic Copolymer B

A silicone acrylic copolymer was prepared by combining silicone methacrylate "SiMac" (22.5 g), methyl methacrylate (MMA, 67.5 g), free radical initiator "VAZO 67" (0.45 g), and ethyl acetate (210 g) in a glass bottle. The bottle was purged with nitrogen and sealed. The bottle of solution was tumbled in a 65° C. water bath for 60 hrs. The bottle of solution was allowed to cool to ambient temperature (22° C.). The solids were determined to be 29.1% by weight loss of samples held for 60 min at 105° C. The inherent viscosity (IV) was measured by conventional means using a Cannon-Fenske #50 viscometer in a water bath controlled at 27° C. to measure the flow time of 10 ml of the polymer solution (1.0 g of polymer per deciliter in tetrahydrofuran) and determined to be 0.25 dl/g.

Evaluation Methods

Haze measurements were made on coated PMMA film before and after an abrasion treatment (falling sand as detailed in ASTM D968-05e1). Coated PMMA films attached to glass were subjected to the following evaluations before and after weathering: sessile water contact angle, transmission, haze, and adhesion testing. Samples attached to glass were prepared as follows. Adhesive obtained from 3M Company under the trade designation "3M 8171 OPTICALLY CLEAR ADHESIVE" was laminated to a glass plate, and then the uncoated side of the PMMA film was laminated to the adhesive with a roller to ensure that there were no air bubbles trapped at either interface.

Weathering Exposure

For weathering, films were exposed in a weathering device according to a high-irradiance version of ASTM G155 Cycle 1 run at slightly higher temperature. Radiation from the xenon arc source was appropriately filtered so as to provide an excellent match to the ultraviolet portion of the solar spectrum. Samples were tested prior to any exposure to these accelerated weathering conditions, and then removed at total UV dosage intervals of 373 MJ/m$^2$ for evaluation.

Optical Properties

The haze (% H) and transmission (% T) were measured using a Haze-Gard Plus (BYK-Gardner USA, Columbia, Md.).

Water Contact Angle

Water contact angles were measured with a static contact angle measurement device (VCA-2500XE from AST Products (Billerica, Mass.) using as-received deionized water filtered through a filtration system obtained from Millipore Corporation (Billerica, Mass.). Drop volumes were about 5 μl for static measurement.

Abrasion Resistance

Samples were abraded in accordance with ASTM D968-05e1 using a Falling Sand Abrasion Tester—Model 820 (Taber Industries, North Tonawanda, N.Y.).

Adhesion

Samples were scored with a utility blade, and then a one inch piece of 3M™ "MAGIC TAPE 810" was applied to the coating over the scored region. The tape was then pulled smoothly off the substrate, and the sample was inspected for evidence of removal of the coating from the PMMA substrate.

Cleanability

Glass-mounted samples were used to evaluate the cleanability of certain coatings. Initial transmission and haze measurements were made as described as described above. The samples were then challenged to a soiling test with SPUT slurry. The SPUT slurry was placed into an acrylic tank measuring 81 cm (32 inches (in.))×38 cm (15 in.)×27 cm (10.5 in.) and kept agitated using an anchor paddle fitted to an air motor. It was sprayed onto the test panels for 2 seconds at a gauge pressure of 20 psig (1.38×10$^5$ Pa) using a "3M BODY SCHUTZ™ APPLICATOR GUN" (available from the 3M Company, Part No. 08997) with the nozzle tip being 74 cm (29 in.) from the panel front surface. After soiling the panel was removed and dried upright for 5 min at 50° C. This cycle was repeated twice more. After the third drying step, the panel was loaded into a separate clean water tank measuring 84 cm (33 in.)×41 cm (16 in.)×36 (14 in.) and sprayed using 60 psig (4.14×10$^5$ Pa) water pressure and deionized water for 5 seconds with the nozzle tip being 81 cm (32 in.) from the panel front surface and without any mechanical scrubbing. The sample was subjected to a final drying step at 50° C.

After this washing procedure, the transmission and haze was measured in three locations on the sample and averaged.

Dry Dust Test

One side of a 2.75 in. (70 mm) by 2.70 in. (69 mm), 2 mm thick clear glass was masked with black tape. Then, the sample was mounted on the glass on the opposite side of the black tape, using a roller to eliminate air bubbles. Initial and final gloss measurements were taken on the sample at angles of 20 and 60 degrees with a micro-TRI-gloss μ glossmeter (BYK-Gardner USA, Columbia, Md.). After the initial reading was recorded, the sample was transferred into a plastic container with a tight lid, and about 10 grams of Arizona Test Dust was added. It was covered and shaken manually horizontally for 1 min. Then, the sample was removed from the container and excess dust was removed by tapping the sample in a vertical orientation on the benchtop. After excess dust was removed, the final gloss measurement was recorded.

Comparative Examples

Comparative Example 1 (CE 1)

PMMA film that had been treated with a 0.5 J/cm² nitrogen corona treatment as described in U.S. Pat. No. 7,442,442 (Strobel et al.) was subjected to the evaluations described in the "Evaluation Methods" above. The results are shown in Tables 2 through 4. A 60,000× scanning electron micrograph was taken of a representative surface for PMMA film after an accelerated weathering exposure of 1119 MJ/m². After 1119 MJ/m², pitting in the surface was observed, but the bulk of the surface was quite flat. This weathered film appeared clear and colorless to the naked eye for all exposure intervals outlined in Table 2. Before and after cleanability evaluation, the measured transmission was 91.6% and 86.7%, respectively, and the haze was 0.6% and 27%, respectively.

Comparative Example 2 (CE 2)

Soda-lime float glass was tested cleaned with acetone to provide Comparative Example 2. Comparative Example 2 was evaluated for abrasion resistance according to the above Evaluation Method. The results are shown in Table 4. Comparative Example 2 was also evaluated for cleanability using the above Evaluation Method. Before and after cleanability evaluation, the transmission was 91.8% and 90.0%, respectively, and the haze was 0.4% and 14.7%, respectively.

Illustrative Example 1 (IE 1)

The coating solution was prepared by combining HDDA, stabilizers, methyl ethyl ketone (MEK), and 1-methoxy-2 propanol according to the formulation listed in Table 1. The components were mixed in dark containers, which were placed on a shaker until all components dissolved and became homogeneously mixed. PMMA film was treated with a 0.5 J/cm² nitrogen corona treatment as described in U.S. Pat. No. 7,442,442 (Strobel et al.). The coating of the hardcoats was performed at 15 cm (6 in.) width. The coating was applied via reverse microgravure coating with a 70 lines per inch (lpi) knurl roll to achieve a 25 microns (1 mil) coating thickness. The film traveled at 6 meters per minute (m/min) (20 feet per minute (fpm)) through a 3 m (10 feet) oven with three successive temperature zones: 60° C., 70° C. and 80° C. respectively. After solvent removal, the dried coating was exposed to a Fusion UV Systems (Gaithersburg, Md.) "D" bulb UV cure at a 70% power setting to provide Comparative Example 2. Samples of this film were evaluated according to the "Evaluation Methods", above. The results are shown in Tables 2 through 5. A 60,000× scanning electron micrograph was taken of a representative sample after an accelerated weathering exposure of 1119 MJ/m². After 1119 MJ/m², pitting in the surface was observed, but the bulk of the surface is quite flat, although not quite as flat as for Comparative Example 1. This weathered film appeared clear and colorless to the naked eye for all exposure intervals outlined in Table 2. As noted in Table 5 this formulation did not retain adhesion to the PMMA substrate after exposure to accelerated weathering.

Illustrative Example 2 (IE 2)

Illustrative Example 2 was prepared according to the method of Illustrative Example 1 with the following modifications. The components were "SR-9041" pentaacrylate (45%), "IRGACURE 184" photoinitiator (0.4%), "IRGACURE 819" photoinitiator (0.4%), "TINUVIN 928" UVA from BASF (3.0%), "TINUVIN 123" HALS (0.4%), MEK (22.5%), and PM (28.1%). The composition was coated and cured on a PET substrate instead of a PMMA substrate. A sample of Illustrative Example 2 was evaluated for haze before and after weathering exposure according to the evaluation methods described above. The initial haze was 2%, and after a dose of 820 MJ/m² of total UV exposure, the haze measured for Illustrative Example 2 was 100%. For comparison, another coating composition was prepared using the same formulation except using HDDA instead of "SR-9041" pentaacrylate. This composition was also coated and cured on a PET substrate and evaluated for haze before and after weathering exposure. The initial haze was 0.6%, and after a dose of 820 MJ/m² of total UV exposure, the measured haze was 4.4%.

Examples 1A-1E

Figure 2:
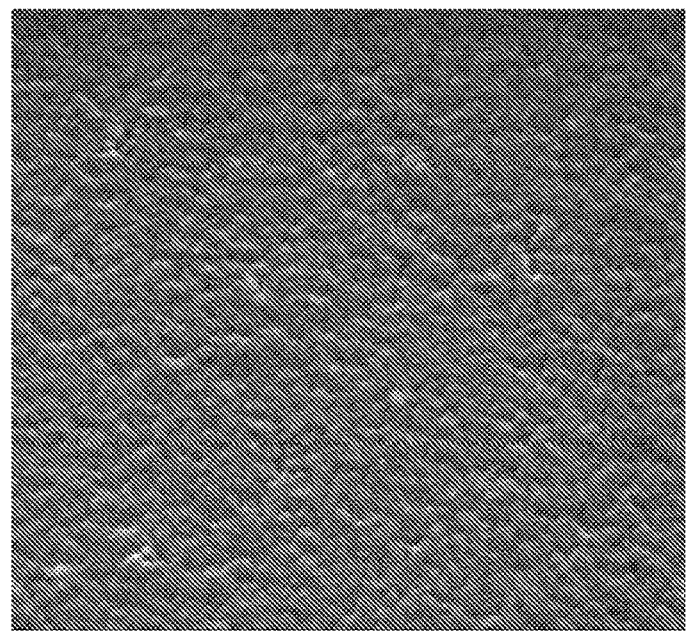
FIG. 2 is a scanning electron micrograph at 60,000× magnification of a representative surface of Example 1D after accelerated weathering.

The components amounts shown in Table 1 for Examples 1A-1E were combined in dark containers, which were mixed on a shaker until all components dissolved and became homogeneously mixed. For the "silica dispersions" of Examples 1A-1E, "Sol B" colloidal silica solutions were used. PMMA film was treated with a 0.5 J/cm² nitrogen corona treatment as described in U.S. Pat. No. 7,442,442 (Strobel et al.). The coating of the Examples was performed at 15 cm (6 in.) width. The coating was applied via reverse microgravure coating with a 70 lpi knurl roll to achieve a 25 microns (1 mil) coating thickness. The film traveled at 6 m/min (20 fpm) through a 3 m (10 ft) oven with three successive temperature zones: 60° C., 70° C. and 80° C. respectively. After solvent removal, the dried coating was exposed to a Fusion UV Systems "D" bulb UV cure at a 70% power setting to provide Examples 1A-1E. Samples of this film were evaluated according to the "Evaluation Methods", above. The results are shown in Tables 2 through 5. A 60,000× scanning electron micrograph of a representative surface for Example 1C after an accelerated weathering exposure of 746 MJ/m² is illustrated in FIG. 1. A 60,000× scanning electron micrograph was taken of a representative surface for Example 1D after an accelerated weathering exposure of 1119 MJ/m² and is shown in FIG. 2. After 1119 MJ/m², no pitting was observed in Example 1D was observed, and the bulk of the surface was quite flat, although not quite as flat as Comparative Example 1. Examples 1A, 1B, and 1C all exhibited color to the naked eye after 1119 MJ/m² of exposure. Examples 1D and 1E, which did not contain colloidal silica, were clear and colorless to the naked eye after all exposure intervals outlined in Table 2. Before and after cleanability evaluation, the measured transmission of Example 1E was 91.7% and 87.3%, respectively, and the measured haze was 0.4% and 27.3%, respectively.

Example 2

Example 2 was prepared and evaluated according to the methods of Examples 1A-1E except using the formulation shown in Table 1 for EX 2 for coating. Example 2 was clear and colorless to the naked eye after all exposure intervals evaluated in Table 2.

Example 3A-3B

Examples 3A and 3B were prepared and evaluated according to the methods of Examples 1A-1C except using the formulations shown in Table 1 for EX3A and EX3B for coating. Dispersions of PMMA-grafted silica, prepared as described above, were used instead of "SOL B". 60,000× scanning electron micrographs were taken of a representative surface for Examples 3A and 3B after an accelerated weathering exposure of 746 MJ/m². Both surfaces were quite flat after that exposure. The surface of Example 3A after weathering is shown in FIG. 3. After 1492 MJ/m² of total UV dose, examples 3A and 3B were both colorless and clear to the naked eye.

Example 4

Example 4 was prepared and evaluated according to the methods of Examples 1A-1E except using the formulation shown in Table 1 for EX4 for coating. The "silicone" was silicone-containing acrylic copolymer A, prepared as described above. After 1492 MJ/m² of weathering exposure, the samples were colorless and clear. Before and after cleanability evaluation, the measured transmission of Example 4 was 91% and 88%, respectively, and the measured haze was 0.4% and 13%, respectively.

Example 5

Example 5 was prepared and evaluated according to the methods of Examples 1A-1E except using the formulation shown in Table 1 for EX5 for coating. The "silicone" was silicone-containing acrylic copolymer B, prepared as described above. Before and after cleanability evaluation, the measured transmission of Example 5 was 91% and 87.7%, respectively, and the measured haze was 0.6% and 11.3%, respectively.

Example 6

Example 6 was prepared and evaluated according to the methods of Examples 1A-1E except using the formulation shown in Table 1 for EX6 for coating. Then an aqueous silica dispersion of a 50:50 weight percent mixture of Nalco 8699: Nalco 1050 colloidal silica was prepared as 10% (w/w) solids in water and adjusted to a pH of 2-3 with nitric acid. This coating dispersion was coated as a second layer on top of the first coating. The coating dispersion was applied via reverse microgravure coating with a 200 lpi knurl roll with the gravure roll speed set to 5.5 meters per minute (18 feet per minute), targeting a dry coating thickness of 1 micrometer. The coated film traveled at 3 meters per minute (10 feet per minute) through a 3-meter (10-foot) oven with three successive temperature zones each set at 80° C. After the second coating was applied, samples of this film were evaluated according to the "Evaluation Methods", above. The results are shown in Tables 2 through 5.

Example 7

Example 7 was prepared according to the methods of Examples 1A-1E except using the formulation shown in Table 1 for EX7 for coating. HDDMA was used instead of HDDA. For the coating of the film, the three successive temperature zones were held constant at 80° C. in each zone, and the UV cure was done at a 90% power setting. Initial haze was measured, and haze was measured again after the abrasion resistance evaluation using the evaluation methods described above. The results are shown in Table 4.

Example 8

Example 8 was prepared according to the methods of Examples 1A-1E except using the formulation shown in Table 1 for EX8 for coating. NGDMA was used instead of HDDA. For the coating of the film, the film traveled at 3 m/min (10 fpm) through a 3 m (10 ft) oven with 3 successive temperature zones that were held constant at 80° C. in each zone, and the UV cure was done at an 85% power setting. Initial haze was measured, and haze was measured again after the abrasion resistance evaluation using the test methods described above. The results are shown in Table 4.

Example 9

Example 9 was prepared according to the methods of Examples 1A-1E except using the formulation shown in Table 1 for EX 9 for coating. TDDA was used instead of HDDA. A coated sample was evaluated for haze before and after being evaluated for abrasion resistance according to the evaluation method above, and the results are shown in Table 4, below. Water contact angle was also measured according to the evaluation method above, and the results are shown in Table 3, below.

Illustrative Example 3

A first coating on a substrate for Illustrative Example 3 was prepared according to the method of Illustrative Example 1 except the following formulation was used: Sol B (39.6%), HDDMA (18.6%), "IRGACURE 184" photoinitiator (0.2%), "IRGACURE 819" photoinitiator (0.2%), "TINUVIN 479" UVA (2.0%), "TINUVIN 123" HALS (0.4%), MEK (23.4%), and PM (15.6%), with all percentages being weight percentages. For the coating of the film, the three successive temperature zones were held constant at 80° C. in each zone, and the UV cure was done at a 90% power setting. An aqueous silica dispersion was prepared from a 50:50 weight percent mixture Nalco 8699:Nalco 1050 silica at 5% (w/w) solids at pH 2.5, adjusted with nitric acid. This coating dispersion was coated as a second coating on top of the first coating. The coating dispersion was applied via reverse microgravure coating with a 150 lpi knurl roll with the gravure roll speed set to 5.5 meters per minute (18 feet per minute), targeting a dry coating thickness of 100 nm to 150 nm. The coated film traveled at 3 meter per minute (10 feet per minute) through a 3-meter (10-foot) oven with three successive temperature zones each set at 90° C. A water contact angle measured after the second coating was applied was <10 using the evaluation method described above. The "Adhesion" evaluation method described above was used on a sample after the second coating was applied, and the coatings were found to adhere. After application of a soiling challenge as described in the Dry Dust Test, Illustrative Example 3 exhibited a drop of 6.1 gloss units when measured at 20 degrees, and a drop of 6.7 gloss units when measured at 60 degrees. By comparison, a sample having just the first coating of Illustrative Example 3 exhibited a drop of 21.4 gloss units when measured at 20 degrees, and a drop of 64.6 gloss units when measured at 60 degrees. Optical Properties were also measured for Illustrative Example 3 after the Dry Dust Test. Illustrative Example 3 exhibited a drop of 0.1% in transmittance and an increase in haze of 1.3% after the Dry Dust soiling challenge. By comparison, a sample having just the first coating of Illustrative Example 3 exhibited a drop of 4.0% in transmittance and an increase in haze of 15.2% after the Dry Dust soiling challenge.

TABLE 1

| | | | | | UVA TINU-VIN 479 | HALS TINU-VIN 123 | Silicone Co-polymer | | |
|---|---|---|---|---|---|---|---|---|---|
| EX | [1]Polymer | Silica Dispersion | Di(meth)acrylate | [2]Initiators | | | | MEK | PM |
| IE1 | None | None | HDDA (36.8) | 0.4/0.4 | 2.0 | 0.4 | None | 36.0 | 24.0 |
| EX1A | 3.1 | Sol B (6.6) | HDDA (30.8) | 0.3/0.3 | 2.0 | 0.4 | None | 36.0 | 20.5 |
| EX1B | 6.2 | Sol B (13.1) | HDDA (24.7) | 0.2/0.2 | 2.0 | 0.4 | None | 36.0 | 17.0 |
| EX1C | 3.1 | Sol B (26.3) | HDDA (21.7) | 0.2/0.2 | 2.0 | 0.4 | None | 36.0 | 10.0 |
| EX1D | 9.3 | None | HDDA (27.8) | 0.3/0.3 | 2.0 | 0.4 | None | 36.0 | 24.0 |
| EX1E | 14.8 | None | HDDA (22.3) | 0.2/0.2 | 2.0 | 0.4 | None | 36.0 | 24.0 |
| EX2 | 6.2 | Sol B (13.2) | HDDA (24.7) | 0.2/0.2 | 2.0 | 0.4 | None | 31.8 | 21.2 |
| EX3A | 3.1 | PMMA-grafted (10.0) | HDDA (30.8) | 0.3/0.3 | 2.0 | 0.4 | None | 31.8 | 21.2 |
| EX3B | 3.1 | PMMA-grafted (40.3) | HDDA (21.7) | 0.2/0.2 | 2.0 | 0.4 | None | 19.3 | 12.8 |
| EX4 | 14.1 | None | HDDA (21.1) | 0.2/0.2 | 2.0 | 0.4 | A (6.8) | 33.1 | 22.1 |
| EX5 | 14.5 | None | HDDA (21.8) | 0.2/0.2 | 2.0 | 0.4 | B (2.7) | 34.9 | 23.3 |
| EX6 | 14.8 | None | HDDA (22.3) | 0.2/0.2 | 2.0 | 0.4 | None | 36.0 | 24.0 |
| EX7 | 6.2 | Sol B (13.2) | HDDMA (24.7) | 0.2/0.2 | 2.0 | 0.4 | None | 31.8 | 21.2 |
| EX8 | 6.2 | Sol B (13.2) | NGDMA (24.7) | 0.2/0.2 | 2.0 | 0.4 | None | 31.8 | 21.2 |
| EX9 | 14.9 | None | TDDA (22.3) | 0.2/0.2 | 1.9 | 0.4 | None | 27.9 | 32.1 |

[1]The polymer was "PARALOID B44" copolymer for all Examples except Example 2, which used "PARALOID B48N" copolymer.
[2]The initiators were "IRGACURE 184" and "IRGACURE 819".

TABLE 2

Haze
Haze (%)

| | Total UV Dose (MJ/m$^2$) | | | | | |
|---|---|---|---|---|---|---|
| Example | 0 | 373 | 746 | 1119 | 1492 | 1865 |
| CE1 | 0.3 | 0.9 | 0.7 | 0.8 | 1.0 | 1.2 |
| IE1 | 0.3 | 0.5 | 0.5 | 0.8 | 1.0 | 1.7 |
| EX1A | 0.3 | 0.4 | 0.5 | 1.0 | 2.6 | 3.6 |
| EX1B | 0.3 | 0.3 | 0.4 | 0.8 | 1.0 | 2.0 |
| EX1C | 0.2 | 0.4 | 0.6 | 2.1 | 7.0 | 9.3 |
| EX1D | 0.3 | 0.4 | 0.5 | 0.8 | 1.0 | 1.0 |
| EX1E | 0.3 | 0.5 | 0.8 | 1.3 | 1.2 | — |
| EX2 | 0.4 | 0.4 | — | — | — | — |
| EX3A | 0.3 | 0.4 | 0.6 | 0.7 | 0.9 | — |
| EX3B | 0.3 | 0.5 | 0.6 | 0.7 | 0.8 | — |
| EX4 | 0.4 | 0.6 | 0.8 | 1.1 | 1.3 | — |
| EX5 | 0.6 | 1.2 | 1.9 | 1.6 | — | — |
| EX6 | 0.5 | 0.4 | — | — | — | — |

TABLE 3

Data Table: Sessile Contact Angle of Water
Sessile Contact Angle of Water (Degrees)

| | Total UV Dose (MJ/m$^2$) | | | | | |
|---|---|---|---|---|---|---|
| Example | 0 | 373 | 746 | 1119 | 1492 | 1865 |
| CE1 | 70 | 65 | 64 | 64 | 66 | 64 |
| IE1 | 91 | 65 | 62 | 58 | 63 | 62 |
| EX1A | 90 | 42 | 37 | 0 | 0 | 0 |
| EX1B | 89 | 40 | 39 | 0 | 0 | 0 |
| EX1C | 90 | 20 | 0 | 0 | 0 | 0 |
| EX1D | 93 | 62 | 65 | 62 | 64 | 60 |
| EX1E | 94 | 56 | 67 | 65 | 63 | — |
| EX2 | 72 | 53 | — | — | — | — |
| EX3A | 70 | 59 | 59 | 66 | ~64 | — |
| EX3B | 72 | 64 | 62 | 68 | ~64 | — |
| EX4 | 96 | 88 | 70 | 69 | 69.3 | — |
| EX5 | 101 | 78 | 63 | 66 | — | — |
| EX6 | <10 | 0.0 | — | — | — | — |
| EX9 | 90.9 | — | — | — | — | — |

TABLE 4

Haze Measurement after Falling Sand Abrasion Test
Haze after Falling Sand Abrasion Test (%)

| Example | Before | After |
|---|---|---|
| CE1 | 0.3 | 27.0 |
| IE1 | 0.3 | 11.2 |
| CE2 | — | 6.0 |
| EX1A | 0.3 | 11.2 |
| EX1B | 0.3 | 11.1 |
| EX1C | 0.2 | 7.4 |
| EX1D | 0.3 | 13.8 |
| EX1E | 0.3 | 18.4 |
| EX2 | 0.4 | 10.0 |
| EX3A | 0.3 | 8.8 |
| EX3B | 0.3 | 14.6 |
| EX4 | 0.4 | 16.3 |
| EX5 | 0.6 | 14.8 |
| EX6 | 0.5 | 19.0 |

TABLE 4-continued

Haze Measurement after Falling Sand Abrasion Test
Haze after Falling Sand Abrasion Test (%)

| Example | Before | After |
|---------|--------|-------|
| EX7 | 0.4 | 16.7 |
| EX8 | 0.6 | 14.0 |
| EX9 | 0.3 | 22.8 |

TABLE 5

Adhesion Before and After Accelerated Weathering
Adhesion to Substrate After UV Exposure

| | Total UV Dose (MJ/m$^2$) | | | | | |
|---|---|---|---|---|---|---|
| Example | 0 | 373 | 746 | 1119 | 1492 | 1865 |
| IE1 | yes | no | no | no | no | no |
| EX1A | yes | yes | yes | yes | yes | yes |
| EX1B | yes | yes | yes | yes | yes | yes |
| EX1C | yes | yes | yes | yes | yes | yes |
| EX1D | yes | yes | yes | yes | yes | yes |
| EX1E | yes | yes | yes | yes | yes | yes |
| EX2 | yes | yes | — | — | — | — |
| EX3A | yes | yes | yes | yes | yes | — |
| EX3B | yes | yes | yes | yes | yes | — |
| EX4 | yes | yes | yes | yes | yes | — |
| EX5 | yes | yes | yes | yes | — | — |
| EX6 | yes | yes | — | — | — | — |

This disclosure is not limited to the above-described embodiments but is to be controlled by the limitations set forth in the following claims and any equivalents thereof. This disclosure may be suitably practiced in the absence of any element not specifically disclosed herein.

What is claimed is:

1. A coating composition comprising:
    a poly(methyl methacrylate) polymer or copolymer having a weight average molecular weight of at least 50,000 grams per mole;
    monomer comprising at least one of an alkylene diacrylate, alkylene dimethacrylate, cycloalkylene diacrylate, or cycloalkylenedimethacrylate, wherein the at least one of an alkylene diacrylate, alkylene dimethacrylate, cycloalkylene diacrylate, or cycloalkylenedimethacrylate makes up at least 80 percent by weight of the monomer, based on the total weight of the monomer in the coating composition; and
    a stabilizer against ultraviolet light, wherein the stabilizer comprises at least one of a UV absorber or a hindered amine light stabilizer.

2. The coating composition of claim 1, wherein the poly(methyl methacrylate) polymer or copolymer has a weight average molecular weight of at least 75,000 grams per mole.

3. The coating composition of claim 1, wherein the poly(methyl methacrylate) polymer or copolymer is poly(methyl methacrylate) or a copolymer of methyl methacrylate and at least one of a $C_2$-$C_8$ alkyl acrylate or methacrylate or a $C_3$-$C_8$ cycloalkyl acrylate or methacrylate.

4. The coating composition of claim 1, wherein the monomeric alkylene diacrylate or a monomeric alkylene dimethacrylate comprises at least one of 1,6-hexanediol diacrylate, 1,6-hexanediol dimethacrylate, or neopentyl glycol dimethacrylate.

5. The coating composition of claim 1, further comprising a silicone-containing acrylic copolymer.

6. The coating composition of claim 1, further comprising silica particles having an average particle size of up to 500 nanometers.

7. The coating composition of claim 6, wherein the silica particles are surface-modified silica particles modified with poly(methyl methacrylate).

8. The coating composition of claim 1, wherein the weight ratio of the monomer comprising at least one of alkylene diacrylate, alkylene dimethacrylate, cycloalkylene diacrylate, or cycloalkylenedimethacrylate to the poly(methyl methacrylate) polymer or copolymer is in a range from 0.75:1 to 10:1.

9. The coating composition of claim 1, further comprising at least one of organic solvent or a photoinitiator.

10. The coating composition of claim 1, wherein the stabilizer against ultraviolet light comprises at least one of a benzotriazole, a benzophenone, a triazine, or a hindered-amine light stabilizer.

11. An article comprising a polymeric substrate and a first coating on a surface of the polymeric substrate, wherein the first coating is obtained by curing the coating composition of claim 1.

12. The article of claim 11, wherein the polymeric substrate is a thermoplastic comprising at least one of an acrylic, a polyester, a polycarbonate, or a blend of polyvinylidene fluoride and poly(methyl methacrylate).

13. The article of claim 12, wherein the polymeric substrate comprises poly(methyl methacrylate), and wherein the surface of the polymeric substrate is nitrogen corona-treated.

14. The article of claim 11, further comprising a second coating disposed on the first coating, wherein the second coating comprises silica particles having an average particle size of up to 500 nanometers.

15. The article of claim 11, wherein the substrate comprises polyethylene terephthalate.

16. The article of claim 11, wherein the substrate is an acrylic mirror film, a multi-layer optical film, a lens, retroreflective sheeting, or a window film.

17. The article of claim 11, wherein the article is exposed to sunlight.

18. The coating composition of claim 1, wherein the coating composition comprises a UV absorber and a hindered amine light stabilizer.

19. The coating composition of claim 1, further comprising a silicone-containing acrylic monomer.

20. A method of making an article, the method comprising:
    contacting a surface of a substrate with the coating composition of claim 1;
    removing organic solvent, if present, from the coating composition; and
    exposing the coating composition to actinic radiation to provide a first coating on the surface of the substrate.

* * * * *